United States Patent [19]

Garcia, Jr. et al.

[11] 4,296,448

[45] Oct. 20, 1981

[54] RECORDING CARTRIDGE HAVING A FLAT SMOOTHING PLANE WITH A RAISED PORTION

[75] Inventors: Felix Garcia, Jr., Round Rock; Roger A. Hergert, Georgetown; Don C. Mann, Richardson; Sheldon H. Brown, Garland, all of Tex.

[73] Assignee: Texas Instruments Incorporated, Dallas, Tex.

[21] Appl. No.: 45,378

[22] Filed: Jun. 4, 1979

[51] Int. Cl.³ .......................... G11B 5/82; G11B 5/016; G11B 17/32

[52] U.S. Cl. ........................................ 360/135; 360/99; 360/102

[58] Field of Search ............................ 360/135, 102, 99

[56] References Cited

U.S. PATENT DOCUMENTS 4,057,840 11/1977 Wingo .................................... 360/99

4,159,494 6/1979 Evans et al. ............................ 360/99

4,208,683 6/1980 Kleczkowski ........................ 360/135

*Primary Examiner*—Robert S. Tupper

*Attorney, Agent, or Firm*—Melvin Sharp; Leo N. Heiting; William K. McCord

[57] ABSTRACT

An improved recording cartridge contains a flexible magnetic recording disc. The lower interior major surface of the cartridge provides a smoothing plane for the flexible magnetic recording disc positioned inside the cartridge to allow the disc to rise slightly above the lower interior major surface on a cushion of air while the disc is in rotation. To enhance the stability of the disc and to make the disc conform more readily to the shape of the magnetic head transducer, the lower interior major surface includes a raised portion thereon. This raised portion gives the disc added rigidity and prevents it from flying away from the head during head penetrations and horizontal movement. The remainder of the smoothing plane surface is relatively flat, thereby permitting a thin cartridge configuration to be used.

13 Claims, 37 Drawing Figures

CONTROL SYSTEM

TMS 1000 MICROCOMPUTER

RECORDING CARTRIDGE HAVING A FLAT SMOOTHING PLANE WITH A RAISED PORTION

BACKGROUND OF THE INVENTION

This invention relates to recording cartridge containing flexible magnetic recording discs and in particular to a recording cartridge having a smoothing plane surface above which the disc rotates during system operation.

In recording or reading information on a moving information storage media, such as a magnetic recording disc, relative motion between a magnetic head transducer used for reading and writing information and the storage media on which information is written on and read from is required. The relative velocity between the head and media interface may be, for example, 550 IPS for video and high density digital applications. To achieve maximum performance, there must be an interface of intimate contact between the head and media surface without destruction or excessive wear of the magnetic flux responsive coating on the surface.

As contact pressure between the head and media is increased to improve performance, both media and head wear are increased. The problem is particularly severe in video applications and compounded with the medias utilized for storing single video frames on separate tracks of a magnetic disc wherein one track at a time is continuously in contact with the head to provide a continuous stationary display of a single frame. In only five minutes of playtime revolving at 3600 RPM, for example, a track on the disc is scraped about 18,000 times by the head; the wear by-products are so hard and abrasive that the same materials are commonly used as lapping compounds.

To prevent failure caused by contact between the head and disc, lubricated surfaces and/or air film separations have been used. However, any separation between the head and disc caused by such lubrication fluid or air film imposes a loss of signal and hence performance. A head/disc separation equal to one wave length could cause about 54.6 dB loss in the output of the replay head. Since it is desired to record wave lengths that approach 1.75 microns, the playback head voltage is reduced to 50% by only 0.19 micron of separation. On the other hand, as disscussed above, reduction of separation to meet desired performance would cause the interface to be destroyed within a few seconds.

Prior art solutions to the head-to-disc interface problem have generally been of two types: flying heads in conjunction with rigid hard-plated discs and heads having large surface areas buried in soft flexible "floppy" discs. Flying head discs are very expensive and require complicated and expensive recording/playback systems. A flexible or so-called "floppy" disc reduces the handling and cost problems incurred in the flying head rigid-disc system. Some record/read heads for "floppy" discs are relatively large to provide an interface comprised of a large contoured head buried in the soft flexible media. The large record/read head surface area distributes the force per unit area to reduce media wear and separation loss. As the media is moved past the head, however, air collects between the head and disc surface to form an air film. The thickness of this air film is a function of media tension, head surface radius, viscosity of the air and disc-head relative velocity. Because of these restraints, most flexible or "floppy" disc applications are limited to slow speed, low bandwidth digital computer applications or voice recording systems.

Systems with the flexible magnetic recording disc which is separated from the recording/playback head by a thin film of air are known in the art. When the head is maintained in close proximity to the disc, but not in contact therewith, effective transfer of the information signal is achieved while at the same time minimizing wear. When a thin cartridge configuration having a flat smoothing plane surface is used, vertical head penetrations as little as 4 mils (0.11 mm) may cause the disc to "fly away" from the head, thus destroying the head-to-disc interface that is necessary for effective system operation. The thin cartridge configuration, while convenient to use, does not provide enough stability for the disc to tolerate vertical head movements. Therefore, system tolerances are critical, which greatly complicates the manufacturing process.

The use of a curved smoothing plane, as described and claimed in U.S. Pat. No. 4,063,295, gives the disc added stability and prevents it from flying away from the head, even during head penetrations of 10 mils (0.254 mm) or more. This allows greater freedom of movement of the head in a vertical plane during operation and facilitates the manufacturing process by permitting larger tolerances in the head position. Use of a curved smoothing plane, however, precludes the use of a thin flat cartridge configuration. The present invention is an improvement of the invention claimed in the aforementioned patent in that it combines the advantages of the curved smoothing plane with the advantages of a thin, flat cartridge configuration.

SUMMARY OF THE INVENTION

It is therefore an object of the present invention to provide an improved technique for storing information on a flexible storage media.

Another object of the invention is to provide an improved system for magnetically storing information on a flexible magnetic recording disc.

A still further object of the invention is to provide a flexible magnetic storage disc cartridge which permits a high performance, narrow-track video magnetic head transducer to be used in contact with the magnetic disc.

It is another object of the invention to provide an apparatus which permits the precise recording and reproducing of wide bandwidth signals such as video signals using inexpensive flexible particulate-type recording media cartridges.

Another object of the invention is to provide a continuously replayable flexible magnetic storage media cartridge in which an air bearing of a preselected thickness between the head and media is maintainable regardless of head loading.

A further object of the invention is to provide a cartridge containing a recording media with a compliant, but resilient magnetic recording surface capable of withstanding shock, vibration and head crashes without media degradation.

A still further object of the invention is to provide an improved system for recording and reading information on a flexible information storage media over a wide range of vertical head alignments and special geometries.

Yet another object of the invention is to provide a relatively thin flexible magnetic recording media cartridge system with an improved uniform head-to-media coupling profile.

Still a further object of the invention is to provide a flexible magnetic recording disc having rigidity and stability as well as flexibility.

These and other objects are accomplished in accordance with the present invention wherein a cartridge contains a sheet of flexible information storage media in an internal chamber thereof. The chamber is defined by first and second end surfaces oppositely positioned, the first end surface acting as a smoothing plane for the media as it rotates inside the cartridge. The smoothing plane surface includes a raised portion surrounded by a relatively flat portion, the raised portion having a predetermined curvature for causing the media to conform to the predetermined curvature as it passes over the raised portion while the media is in rotation.

In one embodiment the cartridge includes a first opening extending through one of the end surfaces for providing access to the media to impart rotational motion thereto and a second opening extending through the smoothing plane surface for receiving a magnetic head transducer for reading and/or writing information on the media. In another embodiment both the first and the second openings extend through the smoothing plane surface, the first opening extending through a central region of the smoothing plane and the second opening being a rectangular opening with a major axis extending at least partially between one side of the smoothing plane surface and the first opening located in the central region thereof.

In a preferred embodiment the cartridge is substantially rectangular in shape and the information storage media is a circular magnetic recording disc disposed within a cylindrical chamber in the cartridge. The cartridge further includes a drive member affixed to a central region of the disc for providing rotational motion thereto when the drive member is rotated. The first opening is a circular opening extending through the central region of the smoothing plane surface and the second opening is a rectangular opening extending perpendicularly inward from one side of the smoothing plane surface. The raised portion on the smoothing plane surface has a radius of curvature of approximately six inches and has a major axis extending parallel to the major axis of the second opening. The raised portion is positioned in the central region of the smoothing plane surface so that the first opening and at least a portion of the second opening extend through the raised portion. As the magnetic recording disc passes over the raised portion, it bends to conform to the curvature thereof. This not only adds rigidity and stability to the disc to prevent it from flying away from the head, but also allows it to conform more readily to the curved recording surface of the head, thereby enchancing the transfer of information signals between the head and disc.

BRIEF DESCRIPTION OF THE DRAWINGS

Still further objects and advantages of the invention will be apparent from the detailed description and claims when read in conjunction with the accompanying drawings wherein:

FIG. 19*b* depicts front end views of the recording and head cleaning cartridges of FIG. 19*a.

DETAILED DESCRIPTION OF A PREFERRED EMBODIMENT

The invention will be described in conjunction with a complete storage system for storing information on a magnetic recording disc. The information storage system described herein is preferably a high density digital information system suitable for storing large quantities of digital information in a small area.

General Description of the Information Storage System

Figure 1:
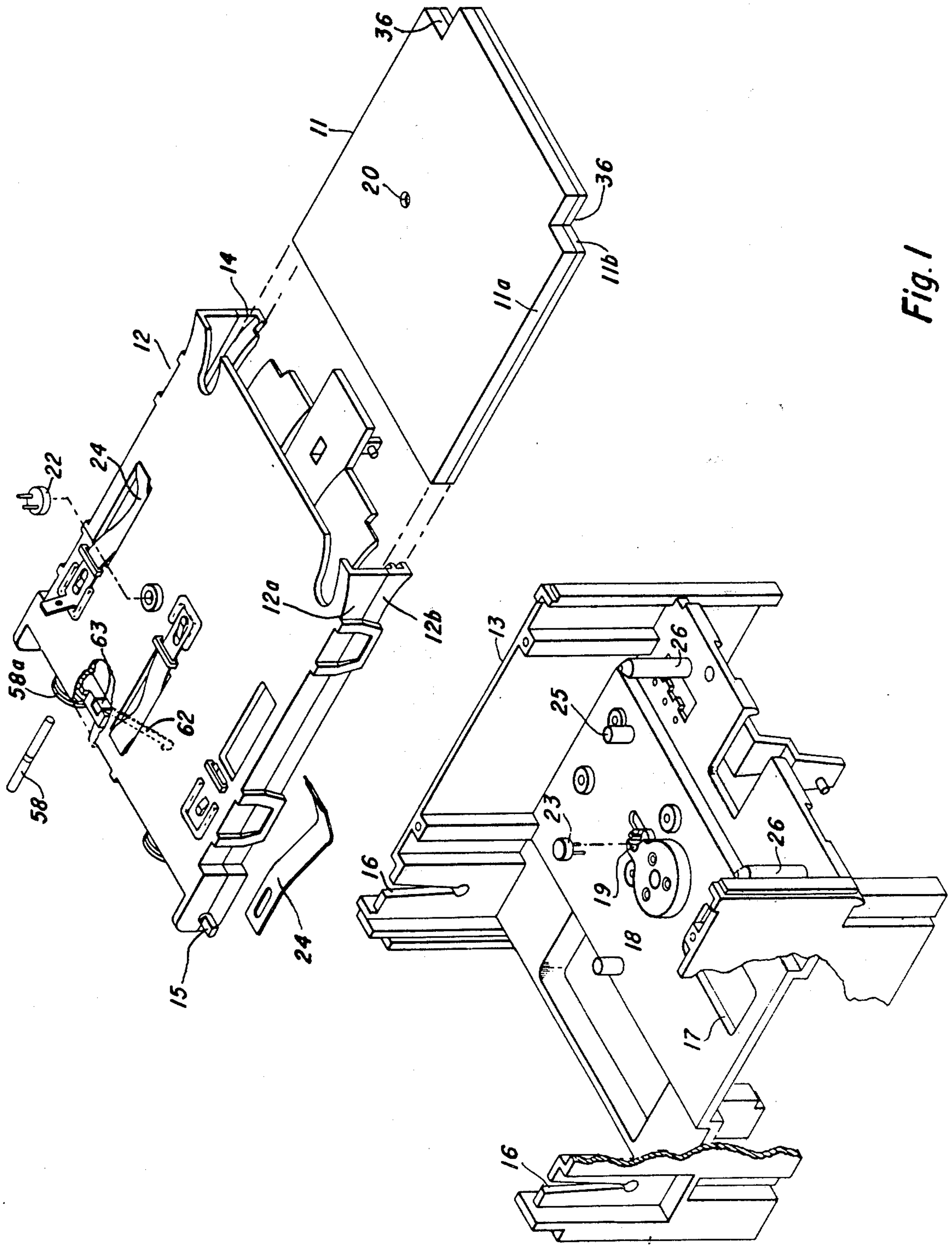
FIG. 1 is a perspective view of the information storage system of the present invention.

Referring to FIG. 1, cartridge 11, cartridge holder 12 and deck 13 are shown in perspective. Cartridge 11 is comprised of upper and lower cartridge members 11*a* and 11*b*, respectively, which snap together to form a protective housing for a flexible magnetic recording disc (not shown) contained therein. Holder 12 includes upper and lower holder members 12*a* and 12*b* which snap together to form a holder assembly for cartridge 11. Holder 12 is normally mounted in deck 13 by the engagement of extension members 15 (one of which is shown in FIG. 1) with vertical slots 16. During system operation, cartridge 11 is inserted into holder 12 through open end 14. Deck 13 functions as a base member for the information storage system and includes means for rotating the disc and reading and writing information thereon. When cartridge 11 and holder 12 are properly located in deck 13, openings 17, 18 and 19 are aligned with respective openings (not shown) in lower holder member 12*b* and in lower cartridge member 11*b*, thereby providing access to the magnetic recording disc for a magnetic head transducer and a rotational means such as a drive motor to engage the magnetic recording disc through openings 17 and 18, respectively.

Upper cartridge member 11*a* and upper holder member 12*a* include openings 20 and 21, respectively, which are in registration with opening 19 and corresponding openings (not shown) in lower cartridge member 11*b* and lower holder member 12*b* when cartridge 11 and holder 12 are properly positioned in deck 13. A light emitting diode 22 is mounted in opening 21 for transmitting light energy through openings 20 and the corresponding opening in lower cartridge member 11*b*. A phototransistor 23 detects the rate at which light energy bursts emanate from cartridge 11 to determine the speed of rotation of the magnetic recording disc. Precise location of cartridge 11 with respect to openings 17, 18 and 19 of deck 13 is essential for effective operation of the system. Specifically, precise alignment of cartridge 11 in deck 13 is required for proper head-to-disc contact and for accurate positioning of the head on various tracks of the disc and also to permit the motor rotational means to engage the disc. Holder 12 includes means for maintaining cartridge 11 in a fixed position therein. Such means include springs 24 mounted on the upper holder member 12*a* for exerting downward pressure on cartridge 11 to hold cartridge 11 in a fixed position. Similarly, deck 13 includes means for properly aligning holder 12 and cartridge 11 and maintaining them in a fixed position. Such means include support members 25 and alignment posts 26. The means used for accurately and precisely locating the magnetic recording disc with respect to the head and motor rotational means are described in more detail below.

Figure 2A:
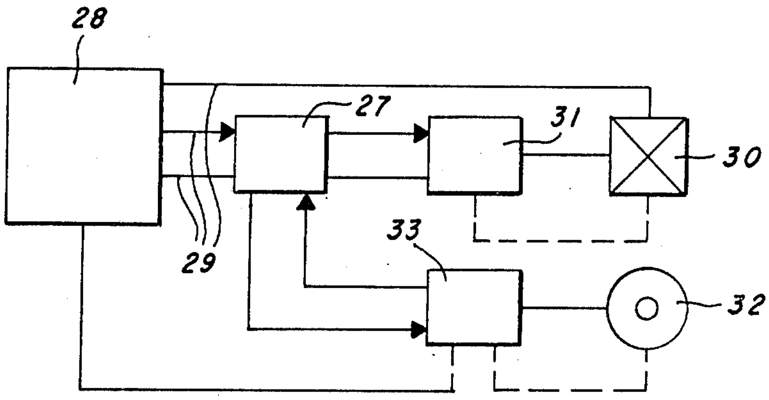
FIG. 2*a* is a block diagram of the electronic control system for the information storage system shown in FIG. 1.
Figure 2B:
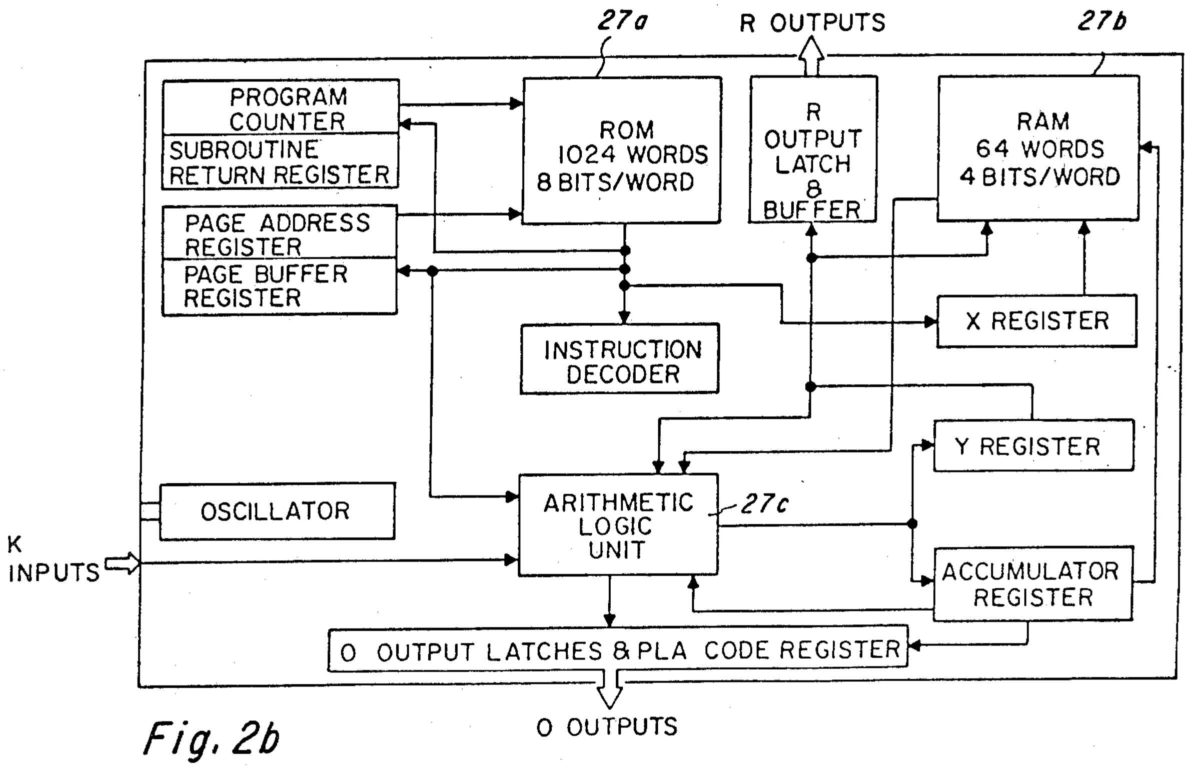
FIG. 2*b* is a block diagram of the components of a single chip microcomputer contained in the electronic control system of the present invention.

Located on the reverse side of deck 13, but not shown in FIG. 1, are the magnetic head transducer, motor rotational means, and the central control system for the information storage system. FIG. 2*a* shows the central control system and the interface with a host machine such as a computing apparatus from which information signals and commands are generated. The heart of the control system is digital processor 27, which is preferably a microcomputer of the TMS 1000 type, manufactured and sold as a standard product by Texas Instruments Incorporated and including a read-only-memory 27*a*, a random-access-memory 27*b* and an arithmetic logic unit 27*c* on a single semiconductor chip as shown in FIG. 2*b*. Digital processor 27 receives various command and data signals from host machine 28 and transmits various return signals to host machine 28 via interface 29. Digital processor 27 further includes means for preventing information signals from being transmitted to magnetic head transducer 30 by host machine 28. Digital processor 27 moves head 30 from one track location to another on the recording disc by selectively controlling a head positioning system 31 and receives a signal indicative of the position of recording head 30 at any given time from head positioning sytem 31. Head positioning system 31 includes a linear servomotor system for linearly moving head 30 across the disc and an optoelectronic system for providing feedback information on the actual position of recording head 30. Similarly, host machine 28 selectively activates motor rotational means 32 via motor controller 33 for providing rotational motion to the magnetic recording disc during the reading and writing of data on the disc. Digital processor 27 controls rotational means 32 when head 30 is being repositioned on disc 37. A separate optoelectronic system, including diode 22 and phototransistor 23, provides real time information indicative of the rotational speed of the magnetic recording disc. Data to be stored on the magnetic recording disc is transmitted as an information signal from host machine 28 to head 30 for storage on the disc. Data read from the disc by magnetic recording head 30 is transmitted back to host machine 28 via interface system 29. The operation of the control and interface system is described in further detail below.

Cartridge and Magnetic Recording Disc

The contents of cartridge 11 including the magnetic recording disc are shown in FIGS. 3*a* through 3*d*. Upper cartridge member 11*a* and lower cartridge member 11*b* of cartridge 11 are substantially rectangular in shape and include rectangular extension portions 35 which form 90 degree angle surfaces 36. Magnetic recording disc 37 is preferably of circular shape and is comprised of flexible plastic or film material with a magnetic flux-responsive coating positioned thereon. Disc 37 includes a plurality of information storage tracks concentrically arranged at predetermined distances thereon. The distance between the centerlines of adjacent tracks is preferably 0.254 mm (10 mils). During system operation, head 30 writes information on and reads information from selected tracks of disc 37. Hub 38 is affixed to the central portion of disc 37 for engaging motor rotational means 32 and transferring rotational motion to disc 37. Hub 38 further includes a latch member 39 projecting radially inward from projection member 40 for engaging a corresponding latch member on motor rotational means 32, as described in more detail below with reference to FIG. 6.

Also included in the central region of disc 37 are a plurality of openings 41 which are concentrically arranged and form part of the optoelectronic system used to measure the speed of rotation of disc 37. As previously mentioned with respect to FIG. 1, light emitting diode 22, positioned in opening 21 of cartridge holder 12, emits light energy which passes through openings 20 in upper cartridge member 11*a* and then, if one of openings 41 in disc 37 is aligned with opening 20, through coresponding opening 42 in lower cartridge member 11*b* and opening 73 (FIG. 4*b*) in lower holder member 12*b*, whereupon phototransistor 23 detects the light energy. Openings 41 in disc 37 are positioned with respect to openings 20 and 42 in cartridge 11 such that as the disc rotates, light energy will be received by phototransistor 23 as a series of intermittent light pulses at a frequency dependent upon the rotational speed of disc 37. When one of openings 41 is aligned with opening 20, light energy passes through cartridge 11 and is detected by phototransistor 23. Phototransistor 23 detects the intermittent bursts of light energy and transmits an electrical signal in synchronism therewith to digital processor 27, thereby permitting digital processor 27 to keep track of the rotational speed of disc 37 and hence the rate at which data is being written on or read from disc 37.

When cartridge 11 is assembled, disc 37 is positioned on interior major surface 43 of lower cartridge member 11*b* so that hub 38 is directly above opening 44. The perimeter of hub 38 is larger than the perimeter of opening 44 so that hub 38 and disc 37 are retained within cartridge 11. Uper cartridge member 11*a* and lower cartridge member 11*b* snap together to form a protective housing for disc 37 and hub 38. When disc 37 s rotated, interior major surface 43 functions as a smoothing plane therefor, i.e. air flows from the exterior of cartridge 11 through opening 44, causing disc 37 to rise slightly above interior major surface 43 on a cushion of air. Interior major surface 43 includes a slightly raised portion 45 having a radius of curvature of approximately six inches. Raised portion 45 provides added rigidity and stability to disc 37 by causing disc 37 to conform to the curvature thereof as disc 37 passes over raised portion 45 during rotation. This added stability is important in maintaining good head-to-disc contact and prevents disc 37 from "flying away" from head 30 when head 30 penetrates as much as 0.254 mm (10 mils) vertically toward disc 37. Since the remainder of lower interior major surface 43 is relatively flat, a thin cartridge configuration can also be used. In addition to increasing the stability and rigidity of disc 37, raised portion 45 causes disc 37 to conform more readily to the curvature of head 30 for more effective transfer of information signals between head 30 and disc 37. Lower cartridge member 11*b* further includes rectangular opening 46 with which head 30 is disposed in registration. Head 30 is positioned at selected track locations on disc 37 by movement along the major axis of rectangular opening 46. The reverse sides of disc 37 and hub 38 are mirror images of the sides shown in FIG. 3*a*, thereby enabling information to be recorded on either side of disc 37.

Figure 3A:
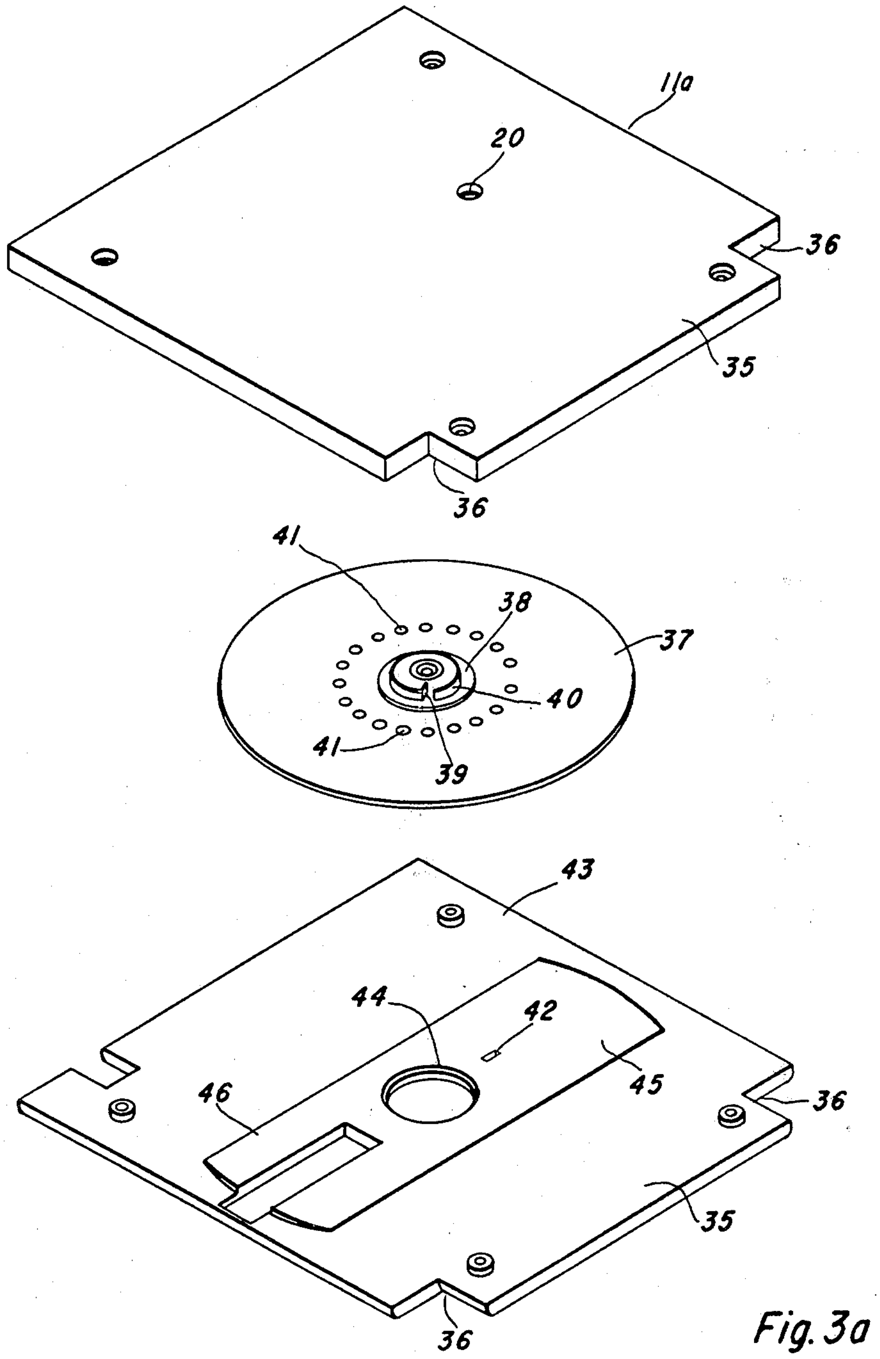
FIGS. 3*a*—3*e* show various views of a recording cartridge and magnetic recording disc of the present invention.
Figure 3C:
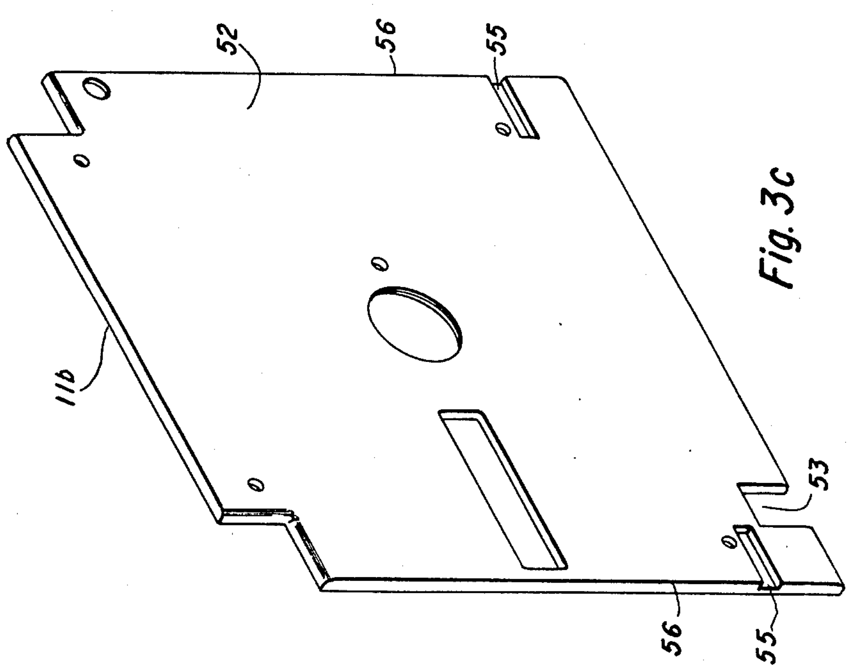
Figure 3D:
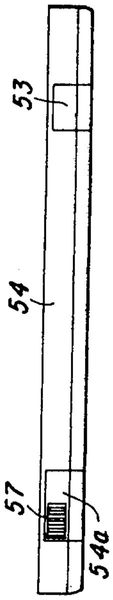
Figure 3B:
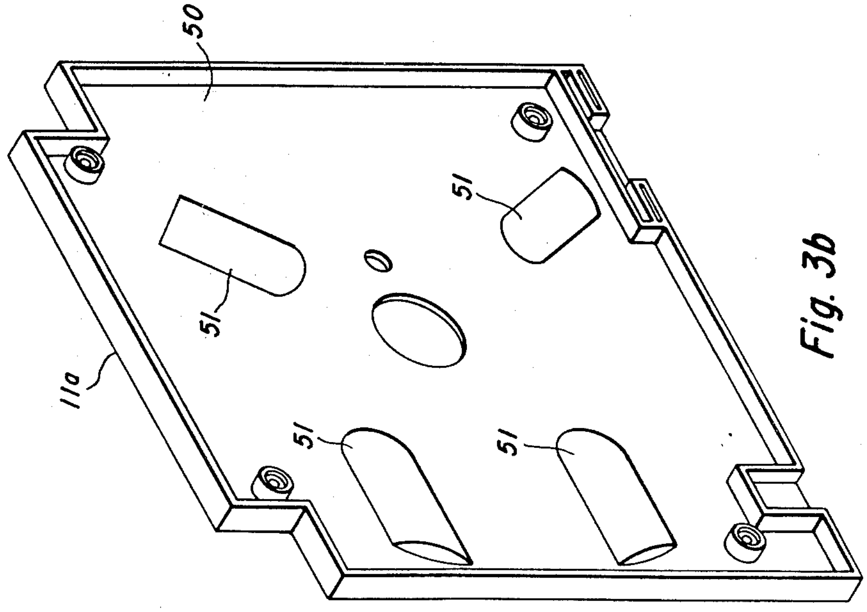

FIG. 3*b* shows interior major surface 50 of upper cartridge member 11*a*. Major surface 50 is substantially flat, rectangular surface, punctuated by four hump-shaped members 51 extending therefrom. As disc 37 rotates, hump-shaped members 51 exert aerodynamic pressure on disc 37 to bias it toward head 30 to maintain good head-to-disc contact for effective system operation. Hump-shaped members 51 have smooth contoured surfaces with a radius of curvature of approximately 0.375 inches to eliminate vibration and flutter which can be transmitted to disc 37 and reduce the purity of video signals in particular. Hump-shaped members 51 compensate for changes in the environmental conditions such as temperature and pressure within cartridge 11 and prevent deformation of disc 37 which can disrupt the transfer of information signals between head 30 and disc 37 by destroying the head-disc interface. As an added feature, interior major surface 50 and hump-shaped members 51 are coated with a conductive material to prevent electrostatic charge build-up on disc 37 and elsewhere within cartridge 11 during system operation.

FIG. 3*c* shows the alignment/positioning features contained on exterior major surface 52 of lower cartridge member 11*b*. Exterior major surface 52 includes a rectangular recess 53 extending perpendicularly inward from end wall 54 (FIG. 3*d*) and elongated rectangular slots 55 extending perpendicularly inward from opposite sides 56 of lower cartridge member 11*b* for mating with corresponding fixtures on cartridge holder 12.

To prevent information stored on disc 37 from being erased, a write protect switch having a slideable button 57 is mounted in recess 54*a* formed in end wall 54 as shown in FIG. 3*d*. Button 57 projects toward the mouth of recess 54*a* and is manually settable at first and second switch positions, representing the WRITE ENABLE and WRITE PROTECT states, respectively.

Figure 3E:
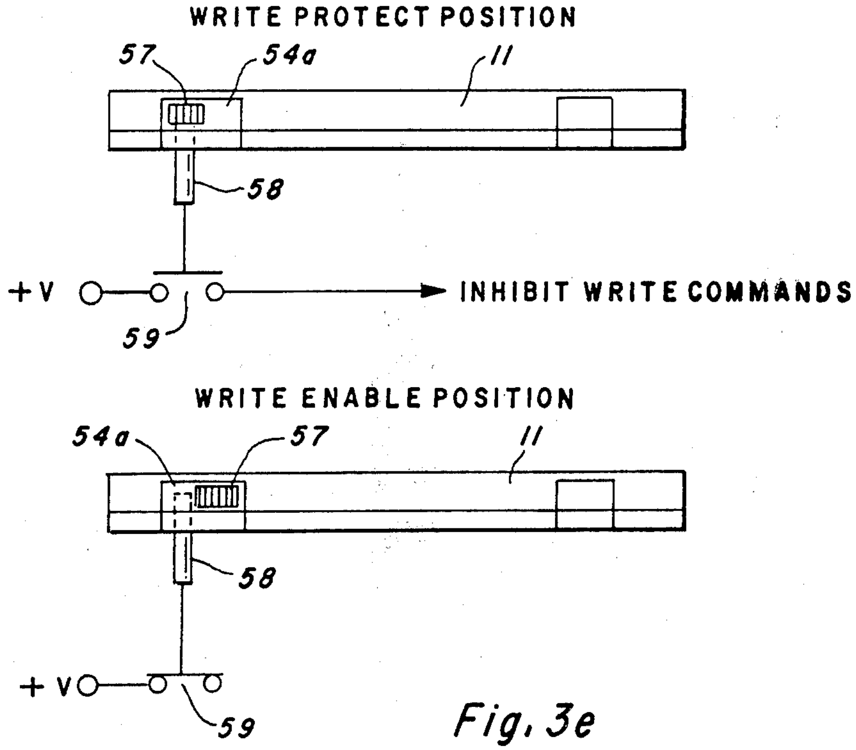

When cartridge 11 is inserted in holder 12, the write protect switch is in abutting relationship with a spring-loaded mechanical member 58 (see FIG. 1), which extends through opening 58*a* in holder 12. Referring to FIG. 3*e*, when button 57 is in the second position, it exerts biasing pressure on mechanical member 58 to open electrical circuit 59, which causes a WRITE PROTECT signal to be generated. The WRITE PROTECT signal inhibits the system from receiving further write commands from host machine 28 and from erasing information already recorded on disc 37.

Alternatively, to enable information to be erased and replaced with new information, button 57 is disengaged from mechanical member 58 and is shifted to the first (WRITE ENABLE) position, thereby releasing mechanical member 58, which protrudes into recess 54*a*. The releasing of button 57 closes electrical circuit 59 and terminates the WRITE PROTECT signal, thereby allowing information to be selectively erased and written over. The WRITE PROTECT switch permits the user to selectively protect the information on disc 37 from erasure or alternatively allow it to be erased.

Cartridge Holder and Deck Alignment Features

Figure 4A:
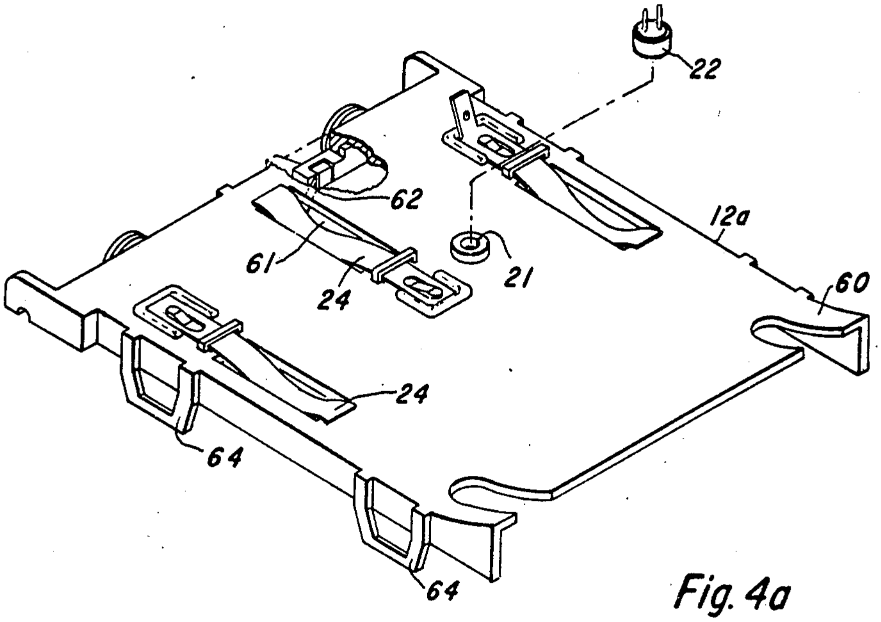
FIGS. 4*a* and 4*b* are perspective views of the upper and lower members of a cartridge holder of the present invention.
Figure 4B:
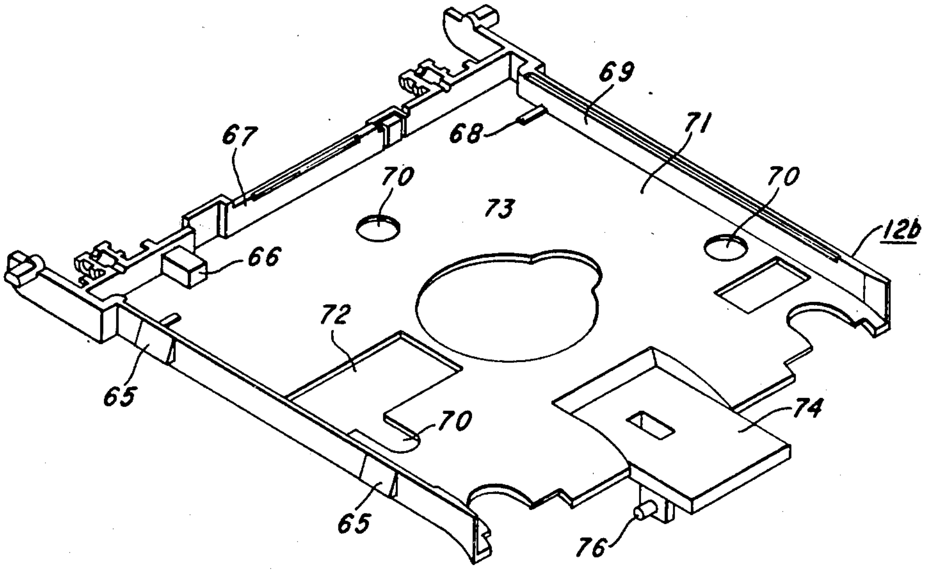

Referring to FIGS. 4*a* and 4*b*, upper holder member 12*a* and lower holder member 12*b* of cartridge holder 12 are shown in perspective. Major surface 60 of upper older member 12*a* includes three openings 61, each having a spring member 24 inserted therein. When cartridge 11 is inserted in holder 12, springs 24 exert downward biasing pressure on cartridge 11 to keep it in a fixed position. Another spring member 62 (FIGS. 1 and 4*a* ) is affixed to the interior end wall 63 of upper holder member 12*a* for exerting a forward biasing pressure on cartridge 11 to facilitate removal thereof. Upper holder member 12*a* further includes loop fasteners 64 attached to each side thereof for engaging projection members 65 on either side of lower holder member 12*b* and locking upper holder member 12*a* and lower holder member 12*b* together to form cartridge holder 12.

Lower holder member 12*b* includes a rectangular extension member 66 extending perpendicularly inward from end wall 67 and a pair of elongated detents 68 extending perpendicularly inward from opposite sides 69. When cartridge 11 is properly inserted in holder 12, rectangular extension member 66 mates with recess 53 on cartridge 11 and detents 68 mate with respective elongated slots 55 in cartridge 11 for maintaining cartridge 11 in a fixed position. Three openings 70 located in major surface 71 of lower holder member **12*b* allow support members 25 of deck 13 to extend therethrough and raise cartridge 11 slightly above major surface 71 during system operation. Support members 25 cooperate with spring members 24 to position cartridge 11 vertically. Opening 72 is in registration with opening 17 in deck 13 and opening 46 in cartridge 11 for allowing access to disc 37 by head 30 and opening 73 is aligned with opening 18 in deck 13 and opening 44 in cartridge 11 for allowing motor rotational means 32 to engage hub 38 and rotate disc 37. Lower holder member 12*b* further includes a tongue-shaped member 74 which extends outwardly therefrom, tongue-shaped member 74 having a tab member 75 extending perpendicularly therefrom in a downward direction. Tab member 75 has a latch member 76 affixed thereto for engaging a corresponding latch member 80 (FIG. 5*b*) on deck 13 for securing cartridge holder 12 to deck 13**.

Figure 5A:
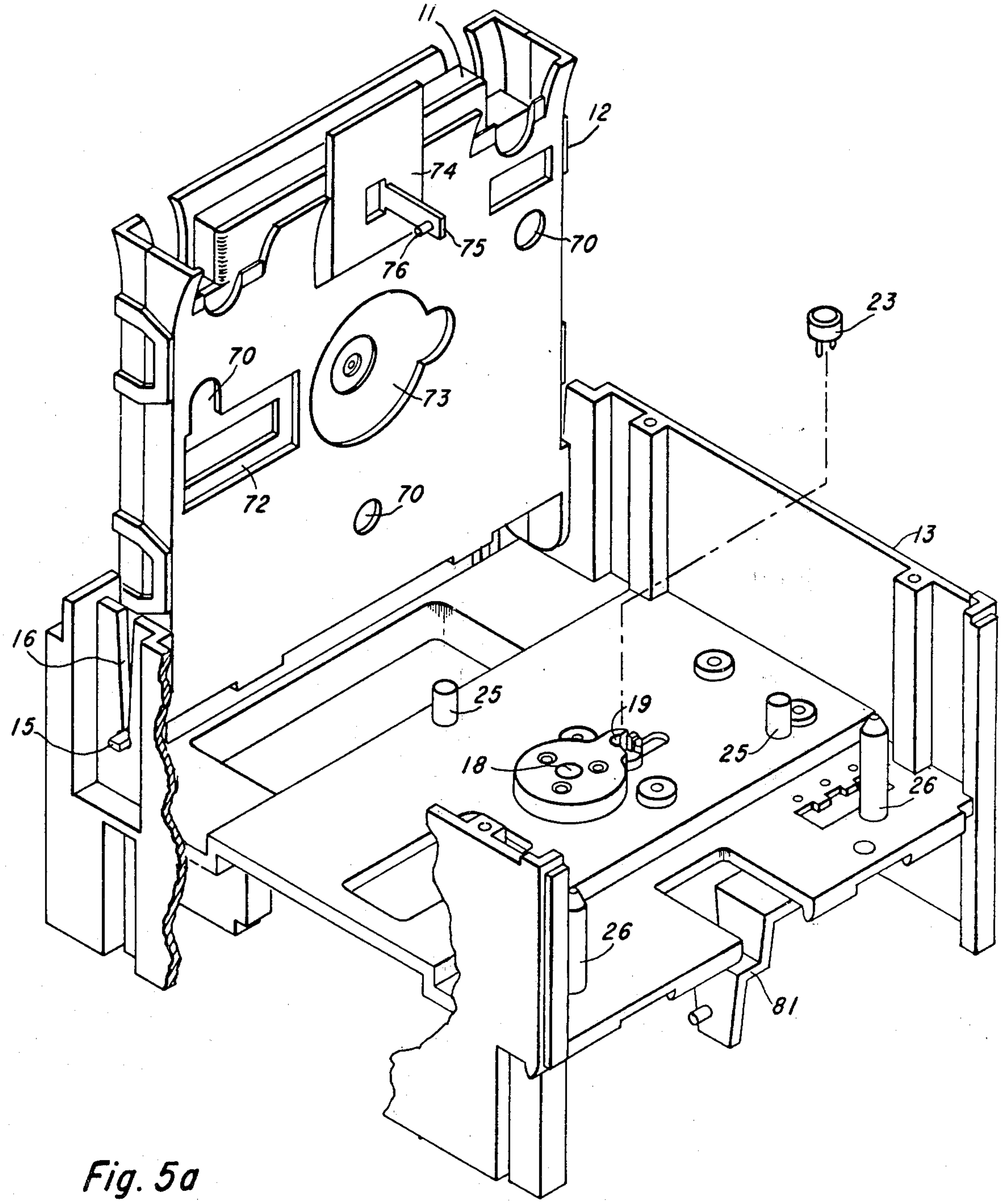
FIGS. 5*a* and 5*b* are perspective views of the cartridge holder positioned in the deck of the information storage system.
Figure 5B:
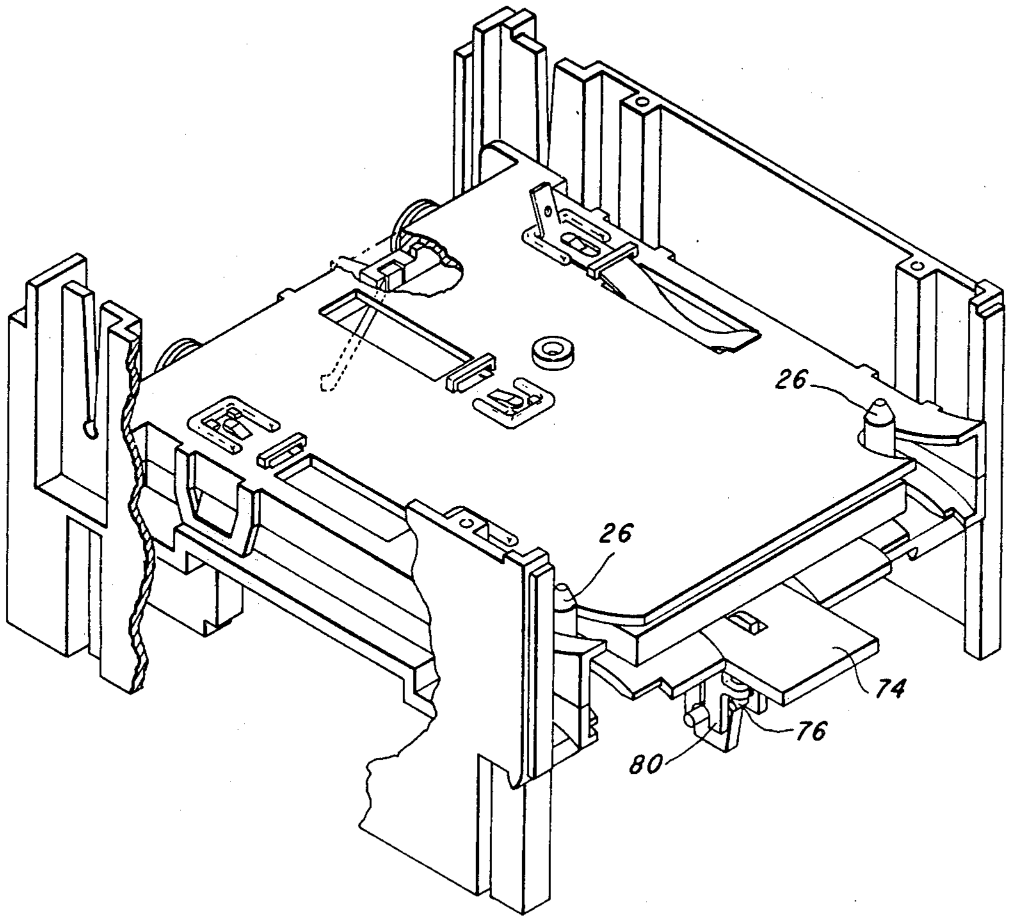

FIGS. **5*a* and 5*b* show cartridge holder 12, with cartridge 11 inserted therein, mounted in deck 13. It should be noted that cartridge 11 is insertable in holder 12 either before or after holder 12 has been mounted in deck 13. To insert holder 12 in deck 13, extension members 15 of holder 12 are inserted into slots 16. Holder 12 is then rotated 90° to a downward position as shown in FIG. 5*b*. When holder 12 is positioned in deck 13, support members 25 in deck 13 extend through openings 70 in holder 12 to raise cartridge 11 slightly above major surface 71 of lower holder member 12*b*. Additionally, as previously mentioned, openings 72 and 73 are aligned with openings 17 and 18, respectively, to ensure access to magnetic recording disc 37 by head 30 and motor rotational means 32, respectively. When holder 12 and cartridge 11 are properly positioned, alignment posts 26 are in abutting relationship with 90° angle surfaces 36 (FIGS. 1 and 3*a*) of cartridge 11. Deck 13 has an extension tab 81 on which latch member 80 is rotatably mounted for engaging latch member 76 of older 12. Holder 12 is easily removeable by disengaging latch members 76 and 80 and rotating cartridge holder 12 90° back to the vertical position shown in FIG. 5*a* and then lifting holder 12 until extension members 15 are clear of vertical slots 16**.

Figure 6:
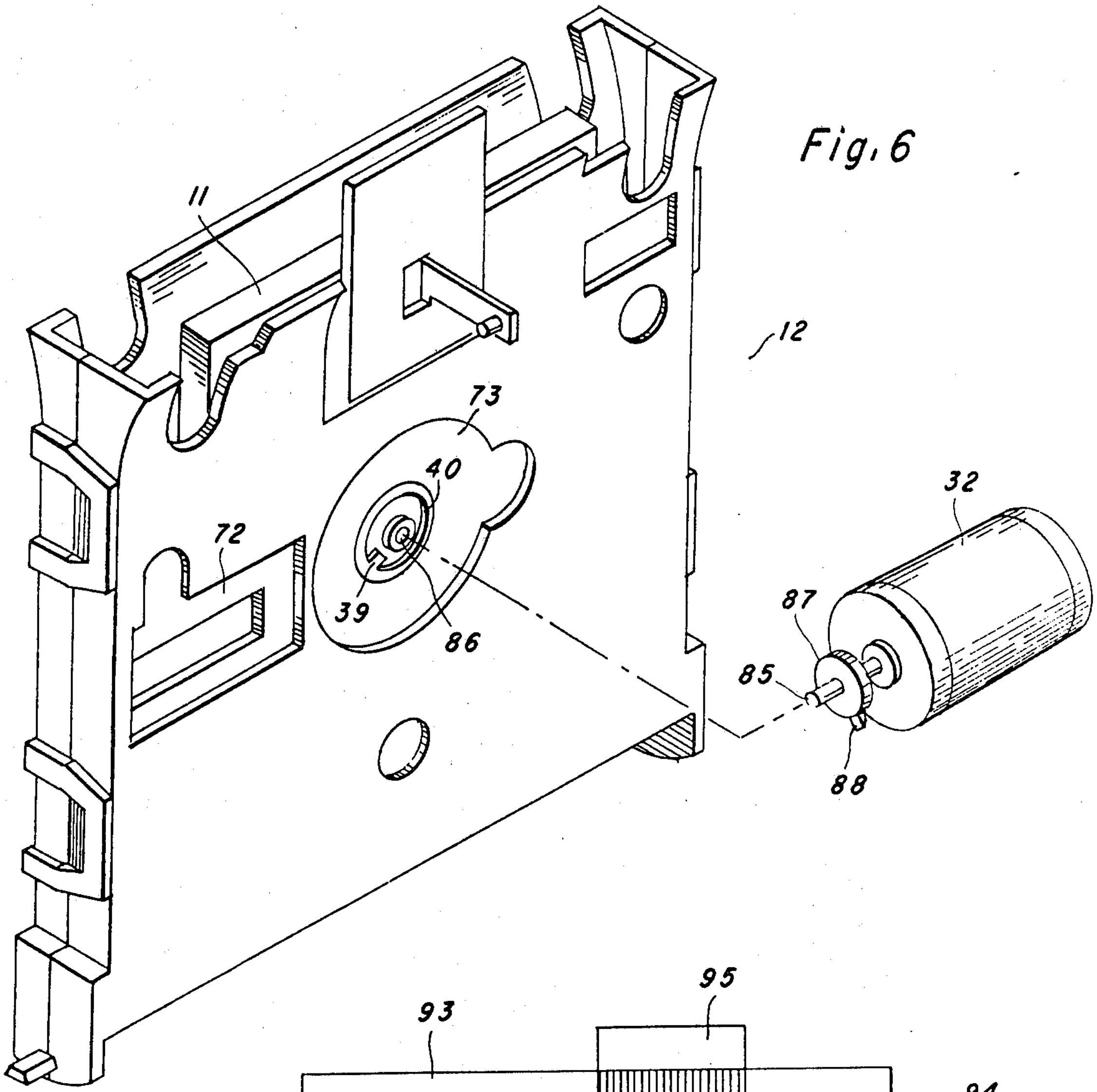
FIG. 6 is a bottom elevational view of the cartridge holder with a recording cartridge positioned therein showing the points of engagement of a motor rotational means with a central hub member affixed to the magnetic recording disc.

Referring to FIG. 6, when cartridge 11 and holder 12 are positioned in deck 13, motor rotational means 32 extends through opening 18 in deck 13 and opening 73 in holder 12 to engage hub member 38. Shaft 85 extends through opening 86 in hub 38 and end member 87 fits within circular projection member 40. Radial projection 88 extending outwardly from end member 83 engages latch member 39 extending inwardly from circular projection member 40 to impart rotational motion to hub 38 and disc 37. When latch member 39 and radial projection 88 are in mating engagement, the outer perimeter of end member 87 is in contact with the inner perimeter of projection member 40 at a point diametrically opposed to the engagement point of latch member 39 and radial projection 88. Thus end member 87 and hub 38 are engaged in the same position at all times, thereby providing greater accuracy in positioning disc 37 with respect to head 30. This unique coupling arrangement between hub 38 and motor rotational means 32 is described and claimed in U.S. Pat. No. 4,216,511.

Recording Head and Head Positioning System

Figure 7:
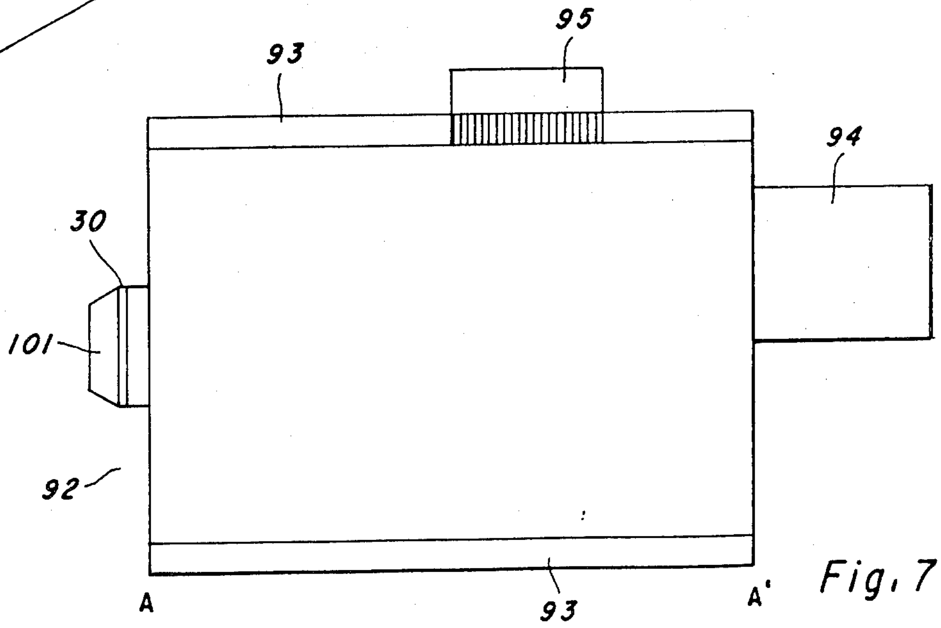
FIG. 7 is a top perspective view of a magnetic head transducer and a head positioning apparatus of the information storage system of the present invention.
Figure 8A:
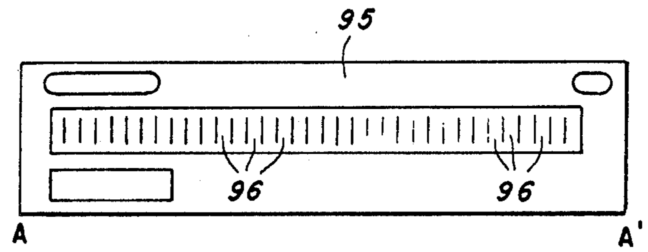
FIGS. 8*a*—8*c* are front elevational views of a shutter and mask assembly used to determine the position of the magnetic head transducer with respect to the disc.
Figure 8B:
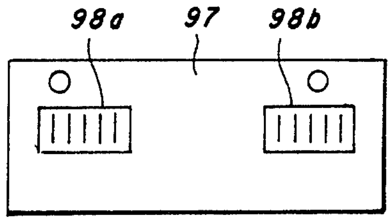
Figure 8C:
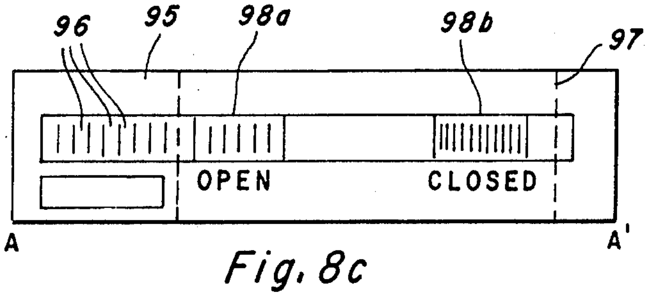
Figure 8D:
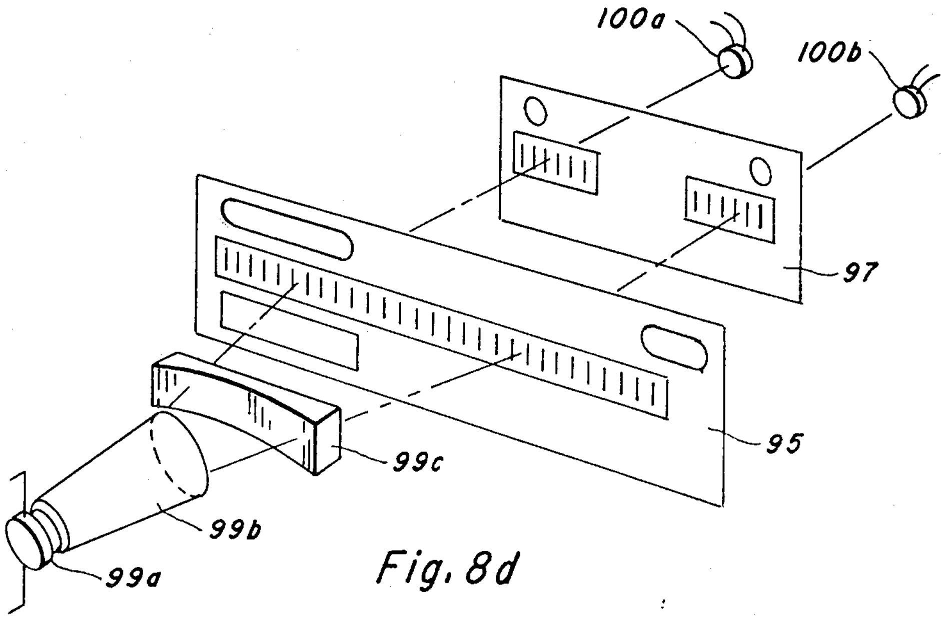
FIG. 8*d* is a perspective view of the optoelectronic system used to determine the position of the head transducer.
Figure 16:
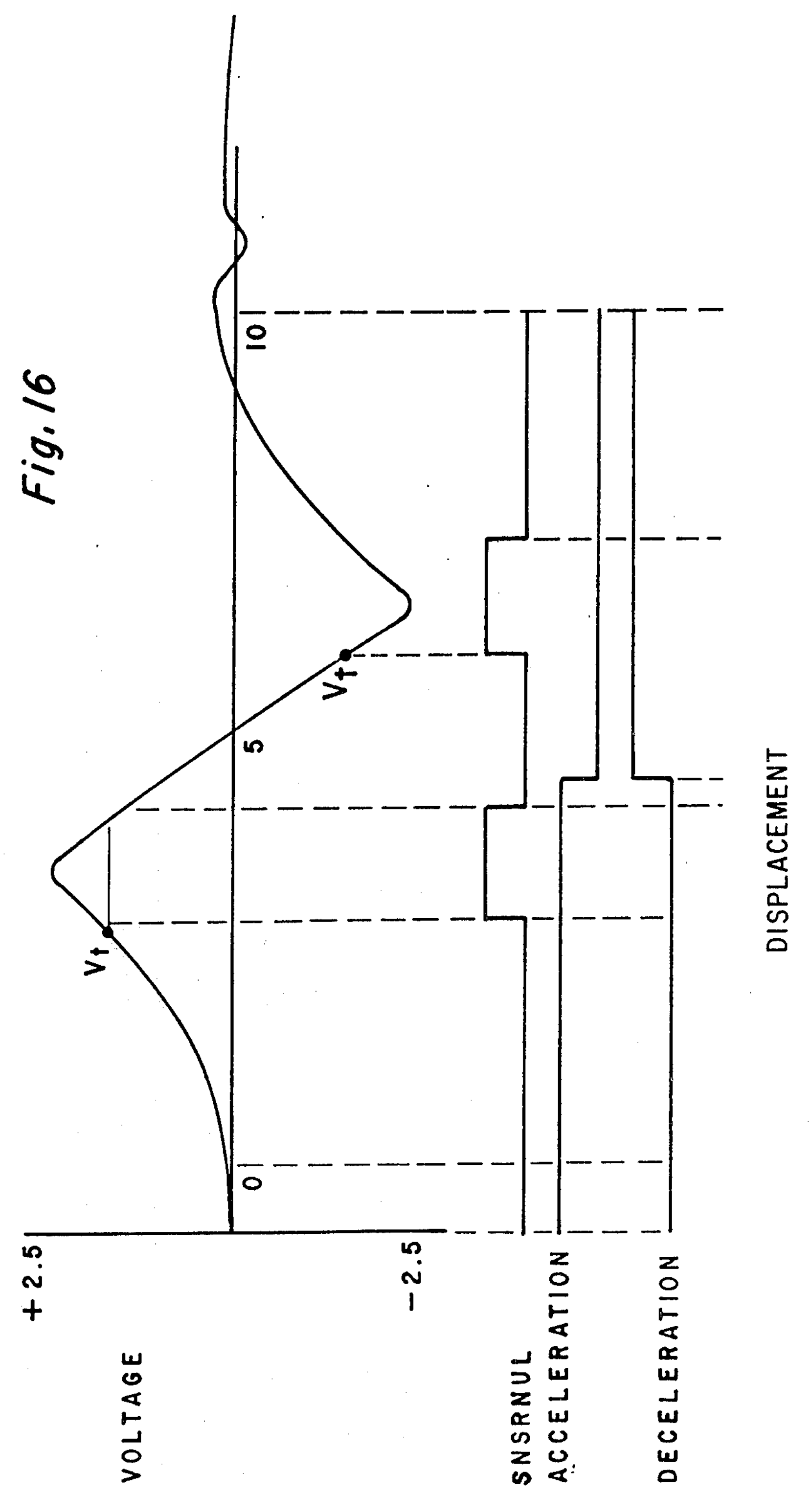
FIG. 16 is a graph showing the various electrical signals generated by the components of the head positioning system of FIG. 15.

As shown in FIG. 7, magnetic head transducer 30 is mounted on slide assembly 92 which includes shafts 93 on opposite sides thereof. Slide assembly 92 is controlled by a linear servo-motor 94 which moves slide assembly 92 and head 30 horizontally along the axis connecting A—A'. Head 30 is positioned in registration with openings 17, 72 and 46 in deck 13, holder 12 and cartridge 11, respectively, so that movement of head 30 along the axis A—A' moves head 30 radially across disc 37. An optoelectronic system is used to determine the track location of head 30 at any given time. The optoelectronic system includes a shutter 95 which is attached to slide assembly 92 and is moved in a linear fashion along with head 30. As seen in FIGS. **8*a*, 8*b* and 8*c*, shutter 95 has a plurality of vertical apertures 96 arranged at predetermined distances along the major axis of shutter 95. Each aperture 96 is approximately 0.127 mm (5 mils) wide, the centerlines of adjacent apertures 96 being approximately 0.254 mm (10 mils) apart. The optoelectronic system further includes a stationary mask 97 as shown in FIG. 8*b*. Mask 97 incudes first and second sets of apertures 98*a* and 98*b*, respectively. As shutter 95 moves back and forth with respect to stationary mask 97, apertures 96 are oriented in various positions with respect to first and second sets of apertures 98*a* and 98*b* so that selected apertures of mask 97 are lined up with selected apertures 96 of shutter 95, thereby permitting light energy generated by a light-emitting diode 99*a* to pass therethrough, while other apertures of mask 97 are not lined up with any of apertures 96 of shutter 95 and are therefore blocked off by the solid portions of shutter 95 so that light energy cannot pass therethrough. A cone-shaped member 99*b* and lens 99*c* focus the light energy emitted by 99*a* to provide a collimated light source. Light energy which passes through apertures 98*a* and 98*b* is detected by a pair of light sensitive diodes 100*a* and 100*b*, respectively, which generate respective electrical signals indicative of the number of open apertures of each set 98*a* and 98*b*. The system is responsive to these signals for generating an AC electrical signal indicative of the relative position of head 30 with respect to a particular track on disc 37 as shown in FIG. 16. Specifically, when head 30 is positioned at one extreme of a particular track, all of the apertures in the first set of apertures 98*a* are aligned with apertures 96, thereby permitting light to pass through, while all of the apertures in the second set of apertures 98*b* are blocked off by shutter 95 so that no light energy passes through. FIG. 8*c* shows shutter 95 positioned ss that all of the apertures of first set 98*a* are open while all of the apertures of second set 98*b* are closed, thereby indicating that head 30 is located at one extreme of a particular recording track. At the other extreme of the track, the opposite is true, i.e. all of the apertures of first set 98*a* are blocked off while all of the apertures of the second set 98*b* are open for light to pass through. When head 30 is at the center of the track, approximately half of the apertures of each of the sets of apertures 98*a* and 98*b* are open for light to pass through while the other half are closed off to light passage. As head 30 is moved radially across disc 37, an AC electrical (see, for example, FIG. 16) signal is thereby generated indicative of the position of head 30 at any given time. In a unique feature of the optoelectronic system just described, shutter 95 and mask 97 are comprised of essentially the same plastic material as disc 37. This enables the position of head 30 with respect to disc 37 to be determined with greater precision by compensating for environmental pertubations, such as changes in temperature and pressure, to which disc 37 is subject and which cause disc 37 to expand and/or contract. Shutter 95 and mask 97 are preferably formed by cutting a piece of the plastic material at an angle of approximately 45° with respect to the manufacturing length of the plastic material. This is due to the fact that the thermal and hygroscopic expansion coefficients of the plastic material are different along the length of the material from the corresponding coefficients along the width of the material. The thermal and hygroscopic expansion of shutter 95 and mask 97 represent averages of these coefficients along both axes of the material and thus are closer to the average coefficients of circular disc 37, which is formed from the same material. In addition, the thermal and hygroscopic time constants of shutter 95, mask 97 and disc 37 are essentially the same. For optimum performance, the end of shutter 95, which is positioned away from head 30 is unbonded and free to move parallel to the direction of movement of slide assembly 92. In one embodiment, performance is further enhanced by bonding mask 97 near the center of disc 37. Mask 97 is free to expand and contract away from the bonded area, parallel to the movement of slide assembly 92**.

Figure 9A:
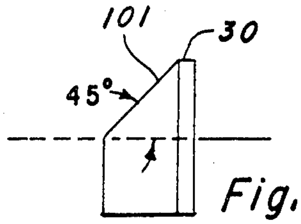
FIGS. 9*a* and 9*b* are side elevational and top plan views, respectively, of the magnetic head transducer with a ramp member attached thereto.
Figure 9B:
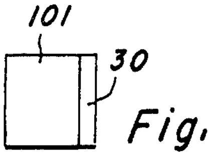

FIGS 9*a* and 9*b* illustrate another unique feature of the information storage system described herein. Magnetic head transducer 30 is affixed to ramp member 101 having an inclined surface sloping downward at a 45° angle away from head 30. Ramp member 101 is positioned between head 30 and the geometric center of disc 37. When the information storage system is not in operation, head 30 is normally positioned away from disc 37 and outside of the perimeter thereof. When head 30 is moved radially toward disc 37 for reading and/or writing data thereon, the perimeter of disc 37 first contacts ramp member 101 at the lower end of the inclined surface and is lifted up and over the top of head 30. This prevents damage to disc 37 due to collision with head 30 as head 30 is moved along the disc. Furthermore, the use of ramp member 101 to move disc 37 vertically into position with respect to head 30 eliminates the need for an additional electromechanical system such as a solenoid device or servo system for moving head 30 vertically with respect to disc 37 when head 30 is repositioned. Therefore, head 30 need only be moved linearly along disc 37 during system operation.

Figure 10A:
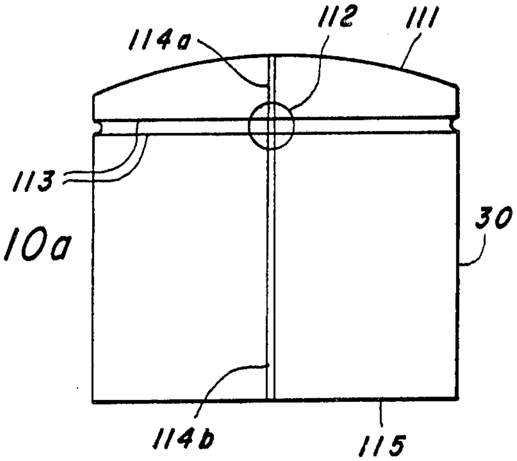
FIGS. 10*a*—10*c* depict various views of the magnetic head transducer of the present invention.
Figure 10B:
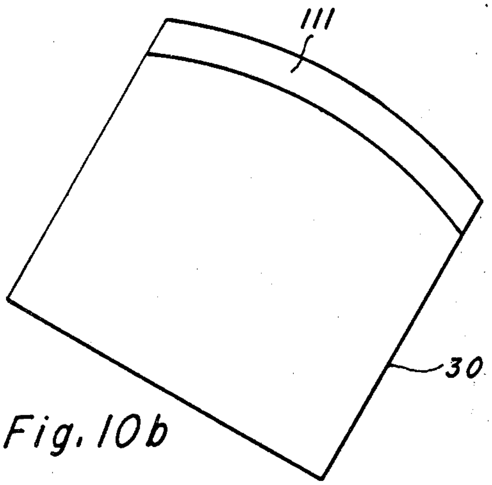
Figure 10C:
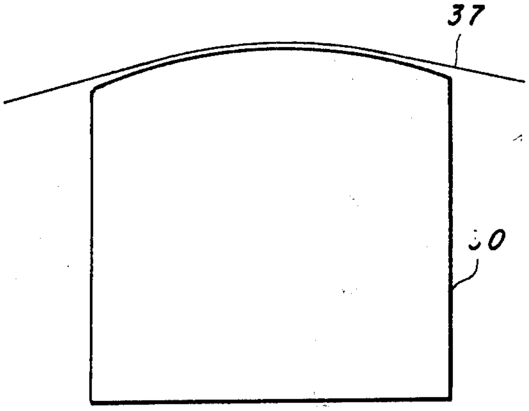

As shown in FIGS. 10*a*, 10*b* and 10*c*, magnetic head transducer 30 is comprised of a relatively thin (0.20 mm or 8 mils) slice of ferromagnetic material and is of substantially rectangular shape with a curved upper recording/playback surface 111. Head 30 is approximately 4.06 mm (160 mils) wide in the direction X—X' and approximately 3.43 mm (135 mils) long in the direction Y—Y'. Positioned approximately 0.76 mm (3 mils) below the apex of recording surface 111 is a circular opening 112 which is approximately 0.20 mm (8 mils) in diameter. Electrical coil 113 is wrapped around head 30 in the direction X—X' and passes through opening 112. Coil 113 is supplied with electrical current to magnetically bias recording head 30 for recording and playback of data on disc 37. Extending along the axis Y-Y' is a thin gap (1 micron) which is comprised of front and rear gaps 114*a* and 114*b*, respectively. Front gap 114*a* extends from the apex of curved surface 111 to the top of opening 112 and rear gap 114*b* extends from opening 112 down to the base 115 of head 30. As part of the manufacturing process for head 30, non-magnetic material is deposited in gaps 114*a* and 114*b* to form a transducing gap. The process used for fabricating head 30 is described in detail below.

Recording surface 111 preferably has a radius of curvature of essentially one inch along its major axis and one-half inch along its minor axis for optimum transfer of the information signal between head 30 and disc 37 while minimizing the amount of wear on disc 37. During recording and/or playback of information, a thin film of air of approximately 0.5 microns operates between recording surface 111 and disc 37 to prevent wear on disc 37, but allow an intimate head-to-disc interface. Disc 37 is flexible enough to move vertically in response to head penetrations into disc 37, but is rigid enough not to "fly away" from head 30 when head 30 penetrates as much as 0.254 mm (10 mils) toward disc 37. An intimate head-to-disc relationship, which is critical for effective system performance, is maintained over a wide variety of head penetrations and alignments. To further enhance signal transfer between head 30 and disc 37, disc 37 bends slightly as it passes over head 30 to conform more closely to the curvature of recording surface 111. As shown in FIG. 10*c*, however, disc 37 has a lesser curvature than head 30 so as to prevent the edges of head 30 from digging into disc 37.

Figure 11A:
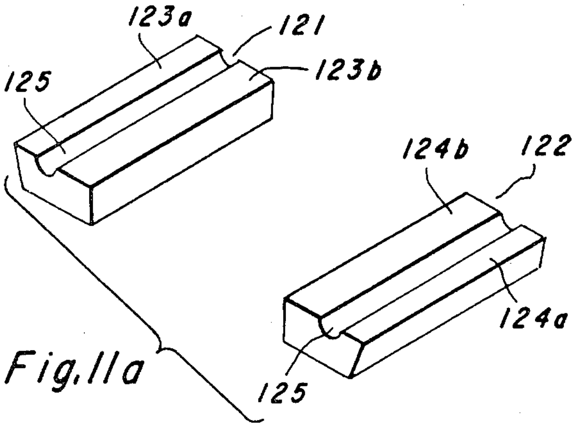
FIGS. 11*a* and 11*b* are perspective views of the components comprising the magnetic head transducer of the present invention.
Figure 11B:
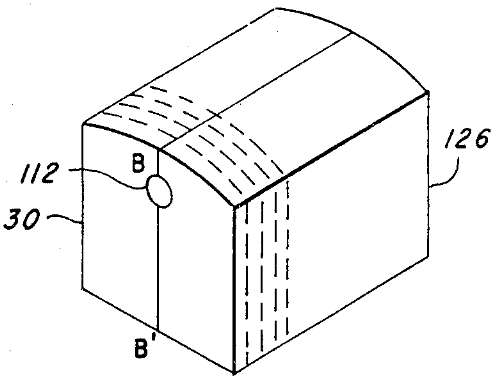

Referring to FIGS. 11*a* and 11*b*, head 30 is comprised of first and second opposed confronting ferromagnetic pole pieces 121 and 122, respectively. Pole pieces 121 and 122 have opposing major surfaces 123 and 124, respectively, which are divided into front gap faces 123*a* and 124*a*, respectively, and rear gap faces 123*b* and 124*b*, respectively. The front and rear gap faces of pole pieces 121 and 122 are separated by a complementary recess 125, which forms opening 112 when pole pieces 121 and 122 are affixed together.

To form the transducing gap, a non-magnetic material is formed on front gap faces 123*a* and 124*a* at a thickness equal to the desired thickness of the transducing gap and a brazing alloy is deposited on rear gap faces 123*b* and 124*b* at a thickness of five to ten percent greater than the thickness of the non-magnetic material. It will be evident to those skilled in the art that the non-magnetic material and brazing alloy may be deposited in a variety of ways. One method of depositing the non-magnetic material involves the deposition of a gas which contains the non-magnetic material on front gap faces 123*a* and 124*a*. Other methods of depositing the non-magnetic material include vacuum deposition using direct current or radio frequency sputtering. The non-magnetic material is deposited at a thickness between 0.5 micron and 5 microns, preferably at a thickness of approximately 1 micron. Alternatively, front gap 114*a* may be formed mechanically by positioning a non-magnetic shim of a thickness equal to the desired width of the transducing gap between front gap faces 123*a* and 124*a*.

The brazing alloy, which is comprised of silver, copper and praedium, is preferably deposited on rear gap faces 123*b* and 124*b* by RF sputtering, which is well known in the art. In RF sputtering pole pieces 121 and 122 are positioned in a vacuum chamber and a target comprised of brazing alloy material is positioned thereabove. A stream of inert gas, such as Argon, is passed across the target and a DC potential or a potential varying at a radio frequency rate is maintained at the surface of the target, thereby producing an ion sheath near the target surface. Ions in the sheath strike the target surface and cause a sputtering of the brazing alloy material by momentum transfer, thereby depositing the material on rear gap faces **123*b* and 124*b*. This process can be adjusted to ensure that the desired thickness of brazing alloy material is deposited. Pole pieces 121 and 122 are secured together with opposing major surfaces 123 and 124 in abutting relationship and heated to the melting temperature (850° C.) of the brazing alloy to intimately affix pole pieces 121 and 122 together to form an integral block piece 126. Block piece 126 is then sliced transversely along an axis B—B' to form a plurality of magnetic head transducers 30, each having a predetermined thickness. It is important that the brazing alloy be deposited at a thickness which is at least five percent greater than the thickness of the non-magnetic material deposited on the front gap faces 123*a* and 124*a* to compensate for the loss of a certain amount of the brazing alloy from leakage and absorption during the brazing process. The result of this process is the production of a magnetic head transducer 30 which has a uniform gap width along the entire length of head 30 and concomitant reduction in the mechanical stress on front and rear gaps 114*a* and 114*b*. Heads 30** fabricated using this process have greatly enhanced signal output performance (4-6 db improvement in the output signal voltage) as compared to head transducers formed using prior art methods in which the non-magnetic material and brazing alloy were deposited at an equal thickness on the gap faces. This results in better fidelity of the recorded signals and less susceptibility of the information storage system to noise and other interference.

Figure 12B:
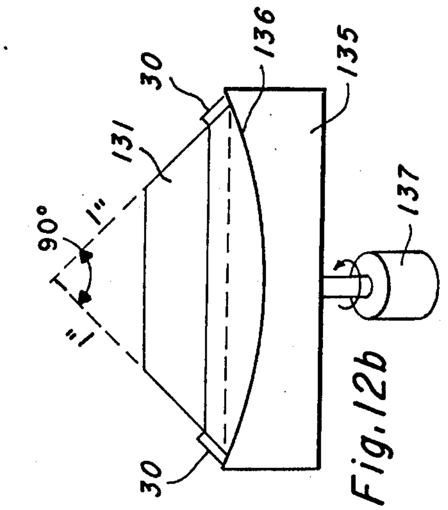
FIGS. 12*a* and 12*b* are cross-sectional views of a positioning apparatus and a grinding apparatus, respectively, for shaping the recording surface of the magnetic head transducer.
Figure 12A:
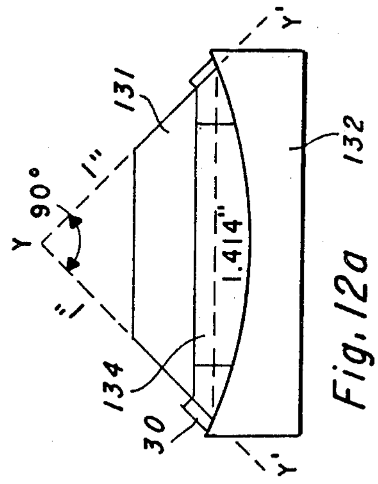

After one or more magnetic head transducers 30 have been sliced from block 126, recording surfaces 111 must be shaped to form the required one inch radius of curvature thereon. A unique lap and tool method is used to precisely contour large quantities of heads 30 so that all of the heads 30 have a uniform shape. Individual heads 30 are secured to respective flat surfaces of a cone-shaped holder 131 as depicted in FIGS. **12*a* and 12*b* and holder 131, with heads 30 attached thereto, is placed in a hemispherical positioning tool, such as transfer block 132, having a concave surface 133 with a radius of curvature of one inch. Selected flat surfaces of holder 131 are oriented so that they lie in planes which are perpendicular to other flat surfaces on holder 131. Spacer means 134 is provided to retain holder 131 in a predetermined position in transfer block 132 so that recording surfaces 111 of heads 30 are tangent to concave surfaces 133 and in abutting relationship therewith. The orientation of heads 30 with respect to concave surface 133 is further adjusted by sliding heads 30 along their respective flat surfaces until the desired position is achieved. When each head 30 is properly positioned, the axis Y—Y' extending along the length of head 30 (FIG. 10*a*) is substantially orthogonal to both recording surface 111 and concave surface 133. Furthermore, when heads 30 are properly positioned, the axis Y—Y' extending through a pair of heads 30 which are affixed to mutually perpendicular flat surfaces form one inch legs of an isosceles right triangle having a base of 1.414 inches extending between the respective points of intersection of the two heads 30 with concave surface 133 as shown by dotted lines in FIG. 12*a*. Therefore, spacer means 134 can be used to properly position heads 30 by adjusting the position of holder 131 and heads 30** so that the aforementioned points of intersection are 1.414 inches apart.

When heads 30 are properly positioned, holder 131 is removed and positioned in a rotatable hemispherical grinding apparatus 135 having a concave surface 136 with a one inch radius of curvature so that recording surfaces 111 of heads 30 are in abutting relationship therewith. Heads 30 are held in a fixed position while concave surface 136 is rotated by motor 137, thereby mechanically grinding recording surface 111 to form approximately the desired one inch contour thereon. To further refine the contouring, recording surface 111 is polished by a series of rotatable hemispherical polishing tools, each having a concave surface with a one inch radius of curvature, in a manner similar to that described with respect to grinding apparatus 135. This provides more precise contouring of recording surface 111 and removes rough spots and other irregularities thereon. The above-described lap and tool method is effective in forming large quantities of precisely contoured magnetic head transducers 30 having uniformly contoured recording surfaces 111. Heads 30 contoured using this method are suitable for use in high performance, high density information storage systems such as the system disclosed herein.

Figure 13:
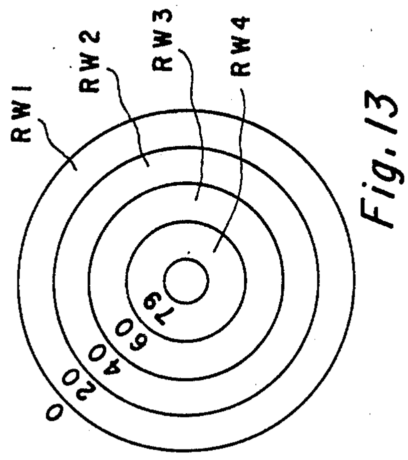
FIG. 13 is a top plan view of the magnetic recording disc of the present invention showing the disc divided into four annular quadrants.
Figure 14:
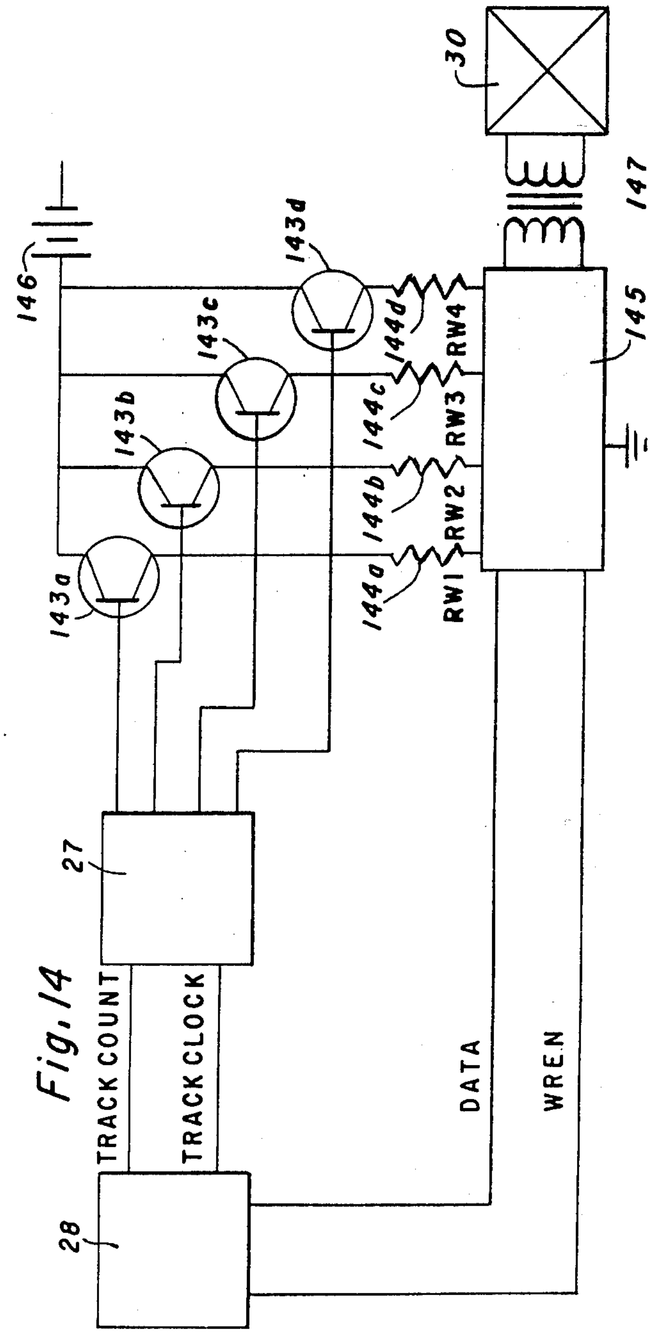
FIG. 14 is a block diagram of the system used to vary the amount of write current supplied to the magnetic head transducer.

In a further feature of the unique information storage system, recording of information signals is accomplished with fewer errors by varying the write current supply to recording head 30 in dependence upon the particular recording track on which data is being recorded. Magnetic recording disc 37 is divided into four quadrants, RW1, RW2, RW3 and RW4, beginning at the perimeter and moving radially inward to the center, as shown in FIG. 13. The first quadrant is comprised of tracks 0-20, the second, tracks 21-40, the third, tracks 41-60 and the fourth, tracks 61-79. As shown in FIG. 14, host machine 28, such as a computing system, determines the particular track on which data is to be recorded and sends a nine bit TRACK COUNT signal to digital processor 27 selecting the particular track on which data is to be written. In response thereto, digital processor 27 sends a TRACK CLOCK signal back to host machine 28 indicating it has received one bit of the TRACK COUNT signal. Digital processor 27, after positioning head 30 on the particular track, determines the particular quadrant in which the track is located and generates an output signal on one of four output lines R5, R6, R7 and R8 to turn on a selected one of four switching transistors **143*a*, 143*b*, 143*c* and 143*d***.

Each transistor has a respective **144*a*, 144*b*, 144*c* and 144*d*, each having a discrete resistance value, in series therewith for varying the current input to recording amplifier 145. Transistors 143*a*, 143*b*, 143*c* and 143*d*, together with their associated resistors 144*a*, 144*b*, 144*c* and 144*d*, provide four parallel electrical paths connecting power supply 146 with head 30. The particular electrical path which is activated by digital processor 27 is a function of the quadrant in which the selected track is located. Transistor 143*a* is turned on whenever the selected track is located in the first quadrant, i.e. tracks 0-20, transistor 143*b* is turned on when the selected track is located in the second quadrant comprising tracks 21-40 and so forth. For example, if computing system 28 selects track 17 on which to write data, digital processor 27 sends an output signal via output terminal R5 to turn on transistor 143*a* and allow current to pass therethrough and through resistor 144*a* to recording amplifier 145 and thence to head 30. Amplifier 145** converts the DC voltage supplied by power supply 146 to an AC voltage supply for head 30. The information to be recorded on disc 37 is transmitted directly from host machine 28 via amplifier 145 to head 30. If, on the other hand, host machine 28 selects track 35, which is in the second quadrant, digital processor 27 activates switching transistor 143*b* which allows current to flow therethrough and through resistor 144*b* to amplifier 145 and head 30. Because resistor 144*b* has a different resistance value from resistor 144*a*, the current supplied to head 30 for writing information on track 35 is different from that supplied to head 30 when information is being written on track 17.

Optimum performance is obtained by supplying the greatest amount of write current to head 30 when data is being recorded on tracks in the first quadrant (the outermost tracks 0-20). This is due to the fact that the outer portion of magnetic recording disc 37 is moving at a greater velocity than the inner portion and therefore the data density is less on the outside tracks when the rate at which data is recorded is constant. When the data density is decreased, a given amount of data is being distributed over a large annular region of disc 37. The outer tracks are therefore more susceptible to the occurrence of inflection points, which produce errors in the information signal. On the inner tracks, such as, for example, tracks 61-79 in the fourth quadrant, the data density is greater than on the outside tracks so that inflection points are less likely to occur. Therefore, a lesser amount of write current supply is required. The write current is therefore varied as a function of track location by choosing the resistance values so that resistor 144*d* has the largest resistance to ensure that the innermost tracks (fourth quadrant) receive the least amount of write current and resistor 144*a* has the least resistance to ensure that the outermost tracks (first quadrant) receive the greatest amount of write current. This arrangement not only reduces errors in the information signal, but also provides improved system fidelity and enables a single head 30 to be used for recording, playback and erasure. Table I lists the instruction codes stored in digital processor 27 for executing the above-described write current routine.

Figure 15:
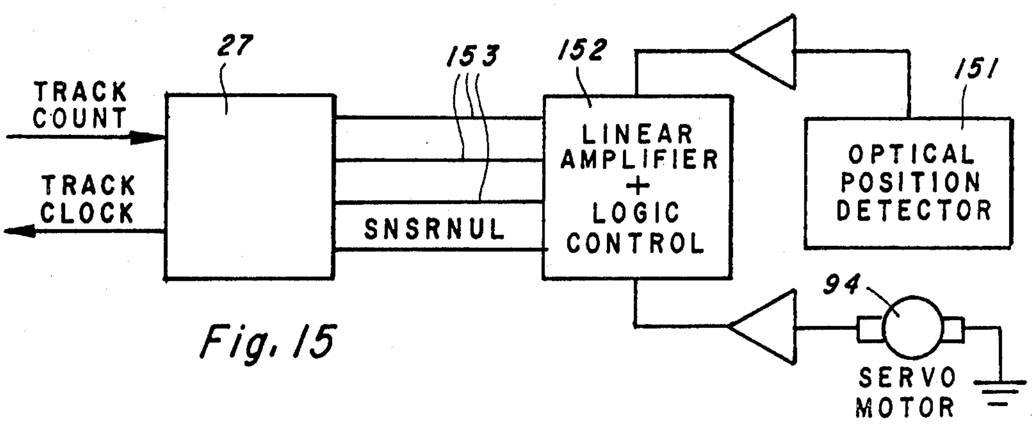
FIG. 15 is a block diagram of the system used to position the head transducer with respect to the magnetic recording disc.

The system depicted in FIG. 15 expedites the movement of head 30 from one track to another on disc 37 and maintains head 30 in a predetermined position with respect to the centerline of a selected track. Movements of head 30 are optically detected by optoelectronic system 151, which generates an AC signal indicative thereof, as shown in FIG. 16. The zero crossing points of the signal at the 0 and 10 positions on the horizontal axis of FIG. 16 correspond to the respective centerlines of adjacent tracks of disc 37. The vertical axis represents the voltage amplitude of the signal. When the amplitude of the AC signal reaches a threshold value, $V_t$, linear amplifier and logic control circuit 152 generates a SNSRNUL signal until the amplitude drops below the threshold value.

Digital processor 27 controls the repositioning of head 30 from one track to another by generating a series of ACCELERATION and DECELERATION control signals via loop state control lines 153. Analog amplifier 152 is responsive thereto for controlling linear servomotor system 94 to move head 30 in accordance with the ACCELERATION and DECELERATION signals from one position to another along disc 37. The repositioning sequence is begun when host machine 28 transmits a TRACK COUNT signal indicative of a selected track location to digital processor 27, which computes the number of tracks between the present location of head 30 and the selected track location and the direction in which head 30 must be moved. If head 30 is to be moved to a position at least 16 tracks away from its present location, head 30 is first moved in one eight-track increment and then in single track increments for the remaining eight or more tracks up to a maximum of 15 single track increments. If head 30 is to be repositioned fewer than 16 tracks, it is moved in single track increments only. Digital processor 27 is programmed so that whenever head 30 is moved one or more increments of eight tracks each the eight track increments are followed by at least eight, but not more than 15 single track increments. The relationship between the number of tracks which head 30 must traverse and the number of eight-track increments through which head 30 is moved to arrive at the selected track is expressed as follows:

$$(M+1)\cdot 8 \leqq N < (M+2)\ 8$$

N = total number of tracks head 30 must negotiate
M = number of eight track increments through which head 30 is moved.

Thus head 30 is moved M increments of eight-tracks each when N is greater than or equal to (M+1)·8.

Figure 17A:
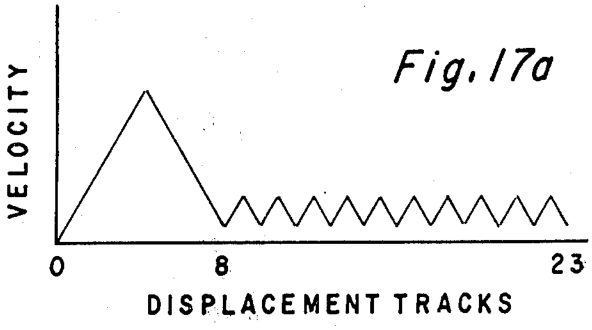
FIGS. 17*a* and 17*b* are graphs showing the velocity of the head transducer as a function of the displacement along the disc.
Figure 17B:
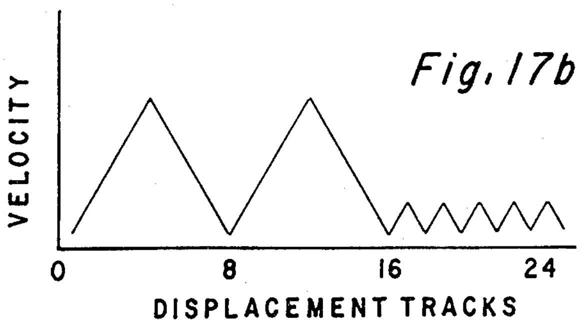

For example, if head 30 is to be moved from track 5 to track 28 (23 tracks), it will be moved in one eight-track increment followed by 15 single track increments, as shown in FIG. 17*a*. However, if head 30 is to be moved 24 tracks, from track 5 to track 29, head 30 will be moved in two eight-track increments followed by eight single track increments, as shown in FIG. 17*b*.

FIG. 16 shows the relationship of the ACCELERATION and DECELERATION signals generated by digital processor 27. When head 30 is being moved in single track increments, the ACCELERATION signal is generated for approximately one-half of each track, followed by the DECELERATION signal for the other half. This causes head 30 to alternately accelerate and decelerate across each track, resulting in the small sawtooth velocity patterns shown in FIG. 17. When head 30 is being moved in an eight-track increment, the ACCELERATION signal is generated for approximately 4.5 tracks, followed by the DECELERATION signal for the remaining 3.5 tracks. This results in the large sawtooth velocity patterns of FIG. 17.

By moving head 30 in one or more increments of eight tracks each, head 30 is repositioned faster on selected tracks, thereby improving system response time. Those skilled in the art will appreciate that digital processor 27 may be programmed to move head 30 in multi-track increments other than eight-track increments. Table II lists the instruction codes stored in digital processor 27 for controlling the repositioning of head 30 on disc 37.

When head 30 is in position on a selected track, analog amplifier 152 maintains head 30 within a predetermined region on either side of the centerline of the recording track. Analog amplifier 152 is responsive to the AC position signal generated by optoelectronic system 151 for generating a restoring force to return head 30 to its centerline or home position. The farther head 30 strays from the centerline, the greater the amplitude of the AC position signal and the greater the restoring force. Preferably, head 30 is constrained to move within a 0.025 mm (1 mil) region on either side of the centerline. When head 30 deviates one mil or more from the centerline, analog amplifier 152 generates a SNSRNUL signal which causes digital processor 27 to go into an ERROR routine, thereby preventing further recording or playback of data while returning head 30 to its proper position.

Figure 18A:
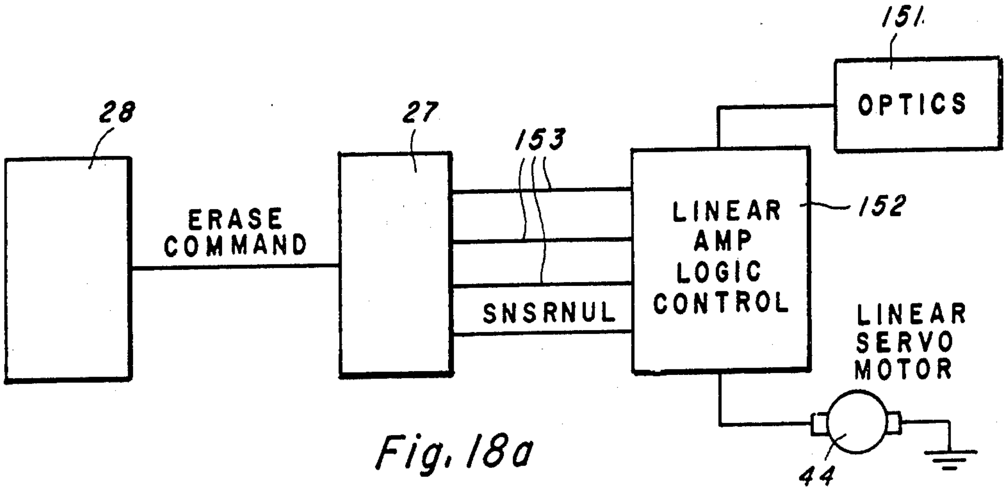
FIG. 18*a* is a block diagram of the system used for erasing information from the disc.

When it is desired to erase information from a particular track on disc 37, host machine 28 transmits an ERASE command signal to digital processor 27 as shown in FIG. 18*a*. Because each recording track is only 0.203 mm (8 mils) wide, head 30 cannot effectively erase the entire area of the track if it remains positioned at the centerline.

Figure 18C:
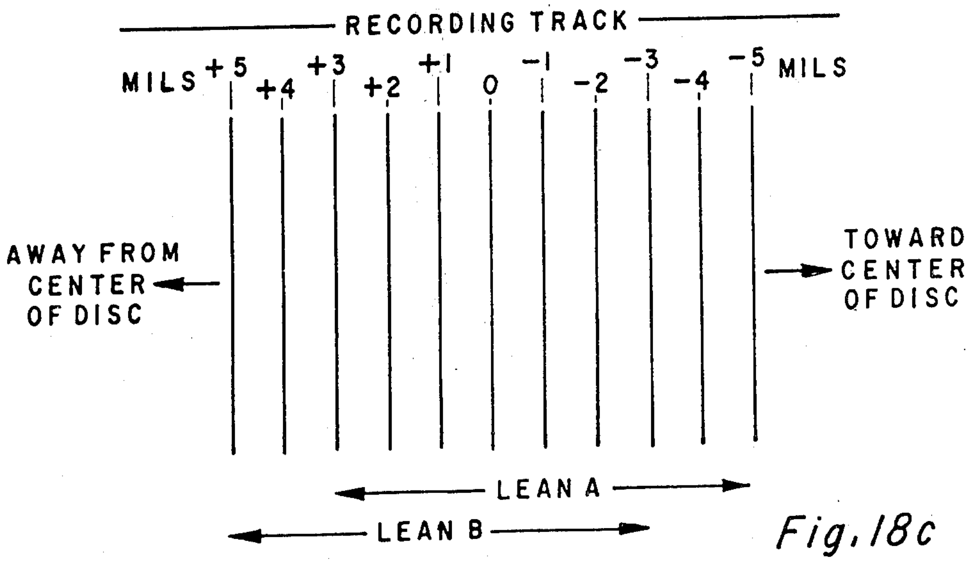
FIG. 18*c* shows the relative positions of the head transducer with respect to the centerline of a recording track where information is being erased.
Figure 18B:
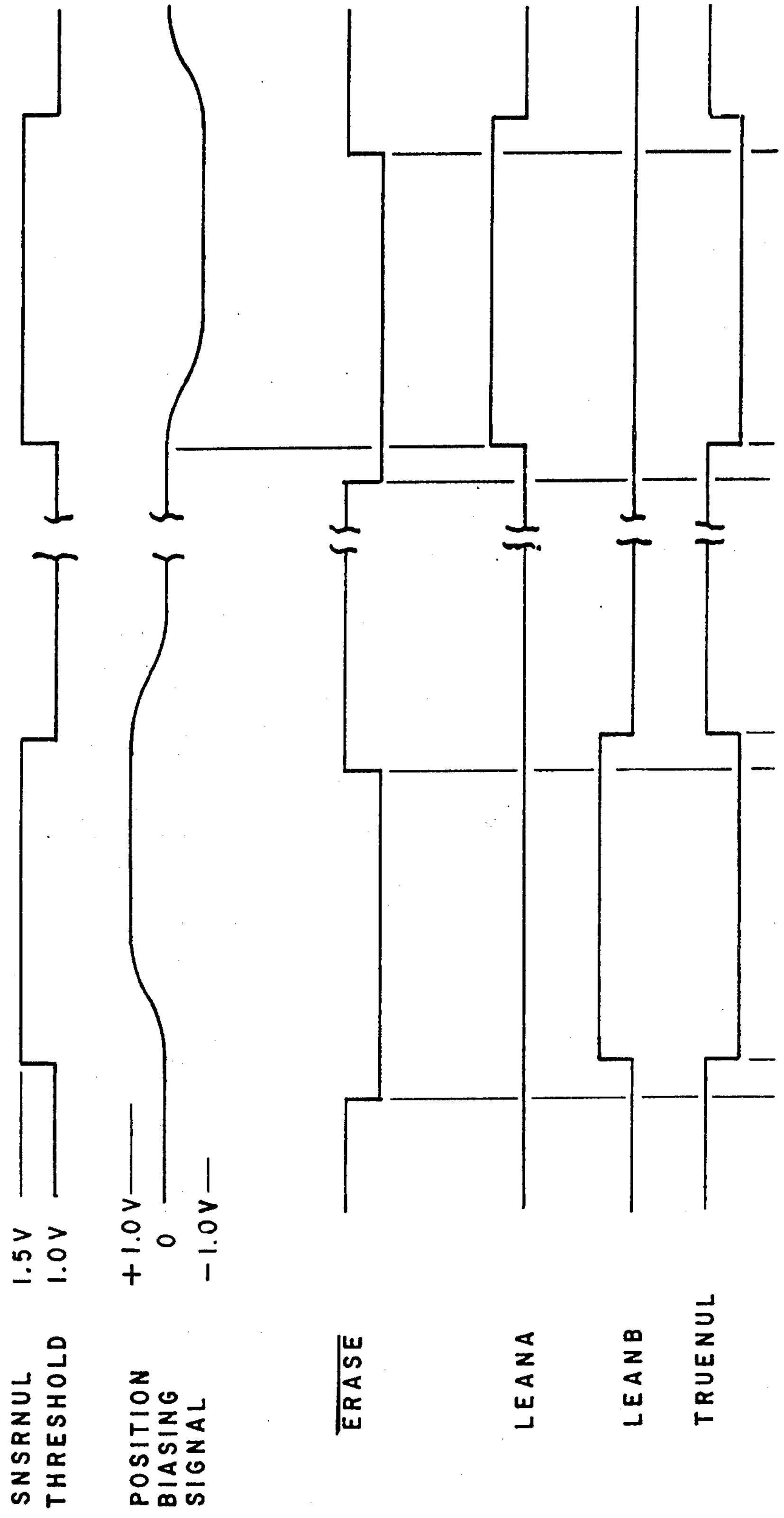
FIG. 18*b* depicts the various electrical signals generated by the information erasing system of FIG. 18*a;*

To ensure that all remnants of the information signal are erased, digital processor 27, in response to the ERASE command signal (ERASE+0), generates LEAN A and LEAN B control signals (FIG. 18*b*), each of which is transmitted as a three bit binary coded signal via loop state control lines 153 to analog amplifier 152. The LEAN A and LEAN B signals introduce position biasing signals of +1 volt and −1 volt, respectively, into the control loop, thereby causing analog amplifier 152 to maintain head 30 at a position which is offset a distance of 0.025 mm (1 mil) from the centerline of the track on either side thereof. When either the LEAN A or LEAN B signal is being generated, the threshold of the SNSRNUL signal is raised from 1 volt to 1.5 volts, which is equivalent to raising the maximum displacement of head 30 from 0.025 mm (1 mil) to 0.38 mm (1.5 mils). This prevents the SNSRNUL signal from going high and triggering the ERROR routine when head 30 is moved or "leaned" to the offset positions for erasing information.

When the LEAN A signal is generated, head 30 is displaced 0.025 mm (1 mil) from the centerline position (zero position in FIG. 18*c*) in a direction toward the geometric center of disc 37 so that head 30 is centered at the −1 mil position. A 3 MHz electrical signal is then supplied to head 30 to erase information in an 0.8 mil (0.203 mm) wide region between the −5 mil and +3 mil positions. When the LEAN B signal is transmitted, head 30 is displaced in a direction away from the geometric center of disc 37 to the +1 mil position. The 3 MHz erase signal is again applied to head 30 to erase information in the 8 mil wide band between the −3 mil and +5 mil positions. Thus the entire 10 mil (0.254 mm) wide recording track is eraseable using this technique. If head 30 strays 1.5 mils (0.038 mm) or more from the centerline, the SNSRNUL signal goes high which activates the ERROR routine (see Table IV) to prevent head 30 from erasing information on adjacent tracks.

When the ERASE command signal goes low ($\overline{\text{ERASE}}$=1), digital processor 27 outputs a TRUENUL instruction via loop state control lines 153 to return head 30 to its centerline position and normal operation is resumed. Table III lists the instruction codes stored in digital processor 27 for executing the ERASE routine.

Figure 19A:
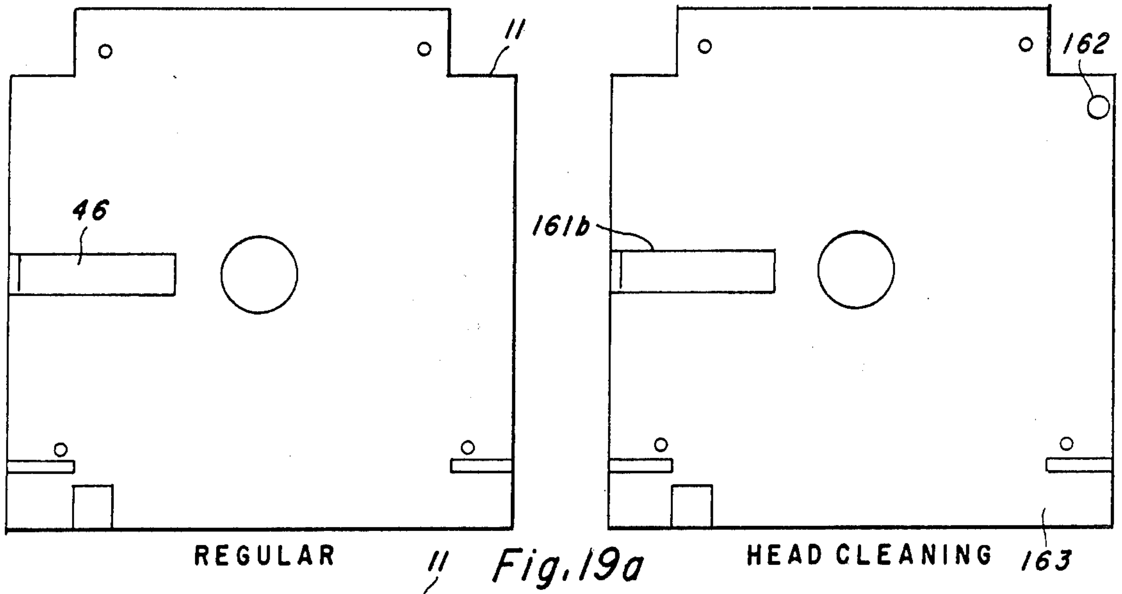
FIG. 19*a* shows bottom elevational views of a recording cartridge and a head cleaning cartridge used in the information storage system of the present invention.
Figure 19B:
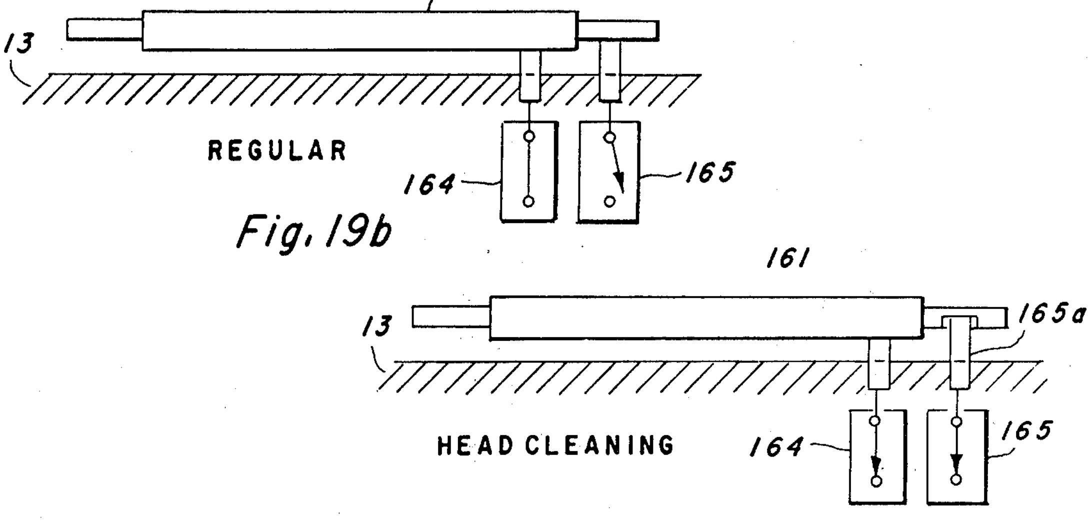

In order to remove debris and other contaminants from recording head 30 which interfere with the head-to-disc interface and prevent effective transfer of information signals, a special head cleaning cartridge 161 (FIGS. 19*a* and 19*b*) is inserted in the information storage system in lieu of the normal cartridge 11 that is used for recording and playback of information. Head cleaning cartridge 161 contains a flexible sheet of abrasive material 161*a* (FIG. 19*c*) and has substantially the same size and shape as recording cartridge 11, including rectangular opening 161*b* which is disposed in registration with head 30 when cleaning cartridge 161 is installed. Abrasive sheet 161*a* has the same size and shape as disc 37 (see FIG. 3*a*) and is comprised of the same flexible plastic material. Rather than having a magnetic flux-responsive coating thereon, as does disc 37, abrasive sheet 161*a* has a rough surface with an abrasiveness on the order of 0.3 microns to clean and polish recording surface 111. Cleaning cartridge 161 includes an additional circular opening 162 located at one corner of lower major surface 163 so that the information storage system can discriminate between recording cartridge 11 and cleaning cartridge 161. When no cartridge is inserted, switch 164 is open and switch 165 is closed. When recording cartridge 11 is inserted in holder 12 of the information system, it exerts downward biasing pressure on both switches 164 and 165 to close switch 164 and open switch 165, thereby transmitting a binary coded signal to digital processor 27 indicative of the fact that recording cartridge 11 is installed in the system. When head cleaning cartridge 161 is inserted, it exerts biasing pressure on switch 164, only to close with switch 164. Switch 165 remains in a closed position, because opening 162 is positioned directly above mechanical member 165*a* of switch 165. Mechanical member 165*a* extends into opening 162 and remains in a released or extended position. Digital processor 27 receives a unique binary coded signal indicating that switches 164 and 165 are closed, thereby informing digital processor 27 that head cleaning cartridge 161 has been inserted.

Figure 19C:
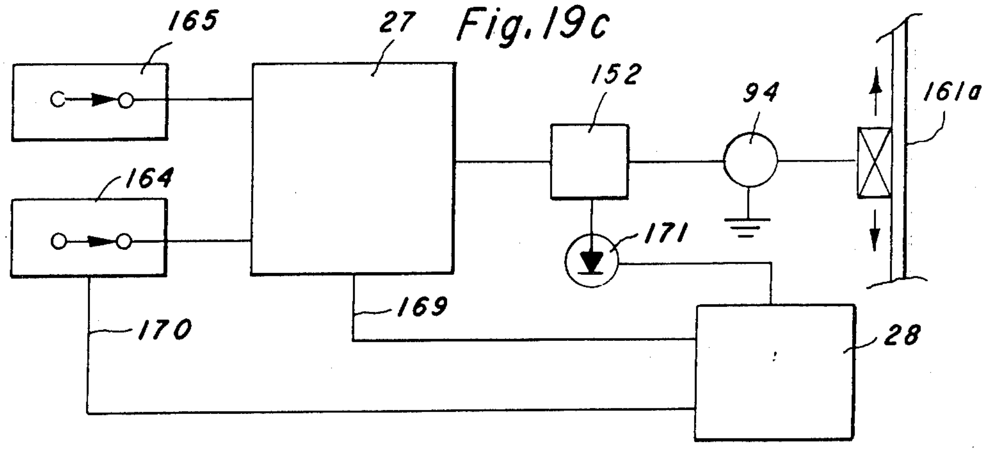
* and FIG. 19*c* is a block diagram of the system used for cleaning debris and other contaminants from the head transducer.

Referring to FIG. 19*c*, when digital processor 27 receives the binary coded signal indicating that head cleaning cartridge 161 is positioned in the system, it executes a head cleaning routine in accordance with the instruction set stored therein. Digital processor 27 controls analog amplifier 152 to activate linear servomotor 94 and move head 30 back and forth radially across the abrasive sheet 161*a* rapidly for 20 seconds, thereby polishing recording surface 111 to remove debris and other foreign matter therefrom. Abrasive sheet 161*a* is flexible and bends to conform more readily to the shape of head 30, thereby providing a more thorough cleaning of the entire recording surface 111. The inside of head cleaning cartridge 161 is similar to the inside of recording cartridge 11 as shown in FIG. 3 and includes four hump-shaped members 51 and raised portion 45 on the lower surface to keep abrasive sheet 161*a* in contact with head 30. The two parallel hump-shaped members 51 positioned above opening 46 in head cleaning cartridge 161 have a more pronounced curvature than the corresponding members 51 in recording cartridge 11 to cause abrasive sheet 161*a* to bend to conform to the shape of head 30 for more effective cleaning.

When the cleaning routine is in process, a COMPLETE signal is transmitted by digital processor 27 via line 169 to host machine 28, indicating that the system is occupied. Switch 164 transmits an electrical signal to host machine 28 via line 170 indicating that a cartridge has been inserted in the system. When abrasive sheet 161*a* is rotated and the cleaning routine begins, light emitting diode 171 is turned on, indicating that the system is in operation. Upon completion of the cleaning routine, head cleaning cartridge 161 is removed. Table V lists the instruction codes stored in digital processor 27 for executing the head cleaning routine.

Various embodiments of the invention have now been described in detail. Since it is obvious that many additional changes and modifications can be made in the above-described details without departing from the nature and spirit of the invention, it is understood that the invention is not to be limited to said details except as set forth in the appended claims.

Table I

```
                    1171   ********************************************************************
                    1172   *                                                                  *
                    1173   *                      READ WRITE LEVEL SET                        *
                    1174   *                                                                  *
                    1175   *                             (RWSET)                              *
                    1176   *                                                                  *
                    1177   *    THE VALUE OF THE ABSOLUTE ADDRESS IS COMPARED TO THE CONSTANTS *
                    1178   *    W,X,& Y.  THE READ/WRITE LEVEL CONTROL LINES ARE SET AS FOLLOWS: *
                    1179   *                                                                  *
                    1180   *                IF        ADDRESS > Y     SET RW4                 *
                    1181   *                IF  Y  >  ADDRESS > X     SET RW3                 *
                    1182   *                IF  X  >  ADDRESS > W     SET RW2                 *
                    1183   *                IF  W  >  ADDRESS > 0     SET RW1                 *
                    1184   *    THE HOME ROUTINE IS THEN EXECUTED.                            *
                    1185   *                                                                  *
                    1186   ********************************************************************

 39  366  01001010  1188   RWSET    TCY    RW1      ADDR RW LINE 1
 33  34E  00001100  1189   RWSETA   RSTR            RESET RW LINE
 27  35D  00101011  1190            IYC             INCREMENT RW LINE ADDRESS
0OE  37B  01011001  1191            YNEC   RW5
 1D  377  10110011  1192            BR     RWSETA   IF RW LINE ADDRESS NOT GREATER THAN RW4 BRANCH
                    1193   *                        AND RESET NEXT LINE
 3A  369  00111101  1194            LDX    2        GET PAGE WITH Y
 35  356  11011001  1195            CALL   LDCMP    LOAD ADDRESES OF Y AND ABSOLUTE ADDRESS.
 2B  36D  00011100  1196            CALLL  COMP     COMPARE ABSOLUTE ADDRESS AND Y
016  35B  11000011  1197
02C  372  01110000  1198            ALEC   0
018  360  10010101  1199            BR     STRW4    IF ABSOLUTE ADDRESS > Y, SETRW4
030  341  00111110  1200            LDX    1        GET PAGE WITH X
0C1  345  11011001  1201            CALL   LDCMP    LOAD ADDRESSES OF X AND ABSOULTE ADDRESS
0C2  34B  00011100  1202            CALLL  COMP     COMPARE ABSOLUTE ADDRESS AND,X
 05  354  11000011  1203
 0B  36C  01110000  1204            ALEC   0
 17  35F  10010100  1205            BR     STRW3    IF ABSOLUTE ADDRESS > X, SETRW3
 2E  37A  00111100  1206            LDX    0        GET PAGE WITH W
 1C  370  11011001  1207            CALL   LDCMP    LOAD ADRESSES OF W AND ABSOLUTE ADDRESS
 38  361  00011100  1208            CALLL  COMP     COMPARE ABSOLUTE ADDRESS AND W
 31  346  11000011  1209
 23  34D  01110000  1210            ALEC   0
 06  35B  10010000  1211            BR     STRW2    IF ABSOLUTE ADDRESS > W, SETRW2,
 0D  374  01001010  1212            TCY    RW1      IF NOT SET. RW1
01B  36F  00001101  1213    SET     SETR            SET RW LINE
```

TABLE II

```
PAD  LOC  OBJECT CODE   STMT  SOURCE STATEMENT

003  183  00011111      446            BL     INIT
001  184  10000000      447
                        448   ****************************************************************
                        449   *                                                              *
                        450   *                                                              *
                        451   *                                                              *
                        452   *          HEAD IS MOVED IN 0 TRACK INCREMENTS                 *
                        453   *                                                              *
                        454   *                                                              *
                        455   ********************                                           *
031  18C  00111100      456   FAST     LDX    0
007  19C  01000001      457            TCY    0
03F  18C  00101111      458            CLA
011  18F  00000011      459            TAM
01C  18F  01001110      460            TCY    7
01C  189  00110111      461            RBIT   3
039  186  01000001      462            TCY    0
03B  1A5  00100011      463            TYA
017  19C  01001110      464            TCY    7
02F  180  00100101      465            AMAAC
01F  188  00000011      466            TAM
03L  181  00111110      467            LDX    1
039  1A6  01001110      468            TCY    7      IS TRCNT = 0? IF SO RETURN TO CONTROL.
013  1AF  00100110      469            MNEZ
027  193  10010110      470            BR     SDIRCT
03F  188  01000001      471            TCY    8
010  197  00100110      472            MNEZ
01A  1A9  10010110      473            BR     SDIRCT
035  196  00011001      474            BL     SSTEP
028  1A9  10000010      475
016  198  01001111      476   SDIRCT   TCY    DIRECT   DETERMINE DIRECTION OF MOVE
02C  187  00111001      477            TBIT1  2
018  1A0  10100113      478            BR     STEPP    REVERSE, GET ACCELERATE REVERSE INSTRUCTION
010  191  01001110      479   STEPF    TCY    ACCELFWD FORWARD, GET ACCELERATE FORWARD INSTRUCTION
021  185  00100011      480   GC       TYA
002  188  00001010      481            TDO              OUTPUT ACCELERATE INSTRUCTION
005  174  01001001      482            TCY    9
009  1AC  01101110      483            TCMIY  7
017  19F  01001001      484            TCY    9
02F  19A  00001000      485   SEQZ     TKA              LOOK FOR POSITIVE TRANSITION OF SNSANL
01C  150  01111110      486            ALEC   7
013  1A1  10101110      487            BR     SEQZ     NOT YES, KEEP LOOKING
031  186  00001000      488   SEQZA    TKA              YES, NOW LOOK FOR NEGATIVE TRANSITION
023  180  01111110      489            ALEC   7
006  190  10011011      490            BR     ACNT     YES, SET DIRECTION TO DECCELERATE
030  184  10110101      491            BR     SEQZA    NO, KEEP LOOKING
```

Table II (cont'd)

```
PAD  LOC  OBJECT CODE   STMT   SOURCE STATEMENT

018  1AF  00101000      492    ACNT     IMAC
016  199  10110100      493             BR     STEPOIR
02D  195  00000011      494             TAM
01A  1A9  10101110      495             BR     SEQ2
014  191  01001111      496    STEPOIR  TCY    DIRECT     DETERMINE DIRECTION OF MOVE.
029  1A5  00111001      497             TBIT1  2
017  168  10011001      498             BR     STPDCR     REVERSE, GET DECELERATE REVERSE INSTRUCTION
024  192  01001101      499             TCY    DECELFWD   FORWARD, OUTPUT DECELFWD INSTRUCTION
009  1A1  00100011      500    STEPOUT  TYA
011  137  00001010      501             TDO
022  1A4  00011110      502             BL     S2A
0-4  193  10001011      503
027  1A4  01001110      504    STPDCR   TCY    DECELREV
013  18F  10001000      505             BR     STEPOUT    GO OUTPUT DECCLERATE REVERSE INSTRUCTION
026  19A  01001101      506    STEPP    TCY    ACCELREV
00C  183  10100001      507             BR     GO
                        508             PAGE
000  1C3  00011111      509             BL     INIT
001  1C4  10000000      510
003  1CC  01001001      511    S2A      TCY    9
007  1DC  01101001      512             TCMIY  7
03F  1FC  01001001      513             TCY    9
01F  1FF  00001000      514    S2       TKA
03F  1FF  01111110      515             ALEC   7
03F  1F9  10011111      516             BR     S2         KEEP TESTING FOR SNSANL HIGH
030  1F6  00001000      517    S3       TKA
03B  1EF  01111110      518             ALEC   7
037  1DE  10011110      519             BR     DCNT
02F  1F0  10111101      520             BR     S3
01E  1F8  00101000      521    DCNT     IMAC
03C  1F1  10100111      522             BR     S4
019  1F6  00000011      523             TAM
033  1C1  10011111      524             BR     S2
027  1D0  00011001      525    S4       CALLL  DCRAD
03F  1F8  11111101      526
010  1F7  00111010      527             TBIT1  1
014  1C9  10010110      528             BR     TSDIRCT
035  106  00011001      529             BL     SSTEP
02B  1C0  10000010      530
016  1D8  00010110      531    TSDIRCT  BL     SDIRCT
02C  1F2  100 0110      532
018  1F0  00111100      533    TRCNTTST LDX    0
010  1C1  01000011      534             TCY    12         IF MOTOR NOT LOCKED,SET SEEKR,AND DONT MOVE.
021  1C5  00111010      535             TBIT1  1
032  1C8  10011100      536             BR     TOTK
025  1D6  01001100      537             TCY    SEEKR
009  1CC  00001101      538             SETR
017  1DF  00010001      539             BL     SCAN
02F  1FA  10001111      540
01C  1F0  00111111      541    TOTK     LDX    3
038  1E1  00010101      542             BL     NEWADDR
031  1C6  10000011      543
023  1CD  00101110      544             XMA
                        545             PAGE
```

```
          OBJECT
PAD  LOC  CODE          STMT   SOURCE STATEMENT
030  243  00011111      611             BL     INIT
001  244  10000000      612
003  24C  01001000      613    LOCK     TCY    MTRLK
037  25C  00001101      614             SETR
00F  27C  010 1011      615             TCY    12
01F  27F  00110010      616             SBIT   1
03F  27C  00010001      617             BL     TEST2
03F  279  10110001      618
                        619    *****************************************************
                        620    *                                                   *
                        621    *       HEAD IS MOVED IN SINGLE TRACK INCREMENTS    *
                        622    *                                                   *
                        623    *                                                   *
                        624    *****************************************************
033  276  01001110      625    DCRAD    TCY    7          DECREMENT LSN
03A  26F  00101010      626             DMAN
037  25F  10110011      627             BR     DCRNA      NO BORROW OCCURED DONT DCRMSN
02F  270  00100000      628             TAMIY             STORE LSN GETMSN
01C  278  00101010      629             DMAN              DECREMENT MSN
03C  271  00000011      630             TAM               STORE MSN
039  266  10100111      631             BR     DCRTST     GO TEST MSN
033  24C  00100000      632    DCRNA    TAMIY             STORE LSN GET MSN
027  260  00100110      633    DCRTST   MNEZ              MSN=0?
03C  270  10011000      634             BR     DCRCONT    NO, CONTINUE
010  277  01001110      635             TCY    7          YES, GET LSN
01A  269  00100110      636             MNEZ              LSN=0?
015  25A  10011000      637             BR     DCRCONT    NO,CONTINUE
02B  260  01000111      638             TCY    14         YES, GET FLAGS
016  258  00110110      639             RBIT   1          SET MEM=0 FLAG
02C  272  00001111      640             RETN
018  260  01000111      641    DCRCONT  TCY    14         GET FLAGS
019  261  00110010      642             SBIT   1          SET MEM #0 FLAG
021  245  00001111      643             RETN
002  248  00111100      644    SSTEP    LDX    0
005  254  01001110      645             TCY    7
008  26C  00100110      646             MNEZ
017  25F  10000110      647             BR     SSDIRCT
02F  27A  01000001      648             TCY    8
01C  270  00100110      649             MNEZ
038  261  10000110      650             BR     SSDIRCT
031  244  00010101      651             BL     SSETPU
023  240  10100011      652
```

Table II (cont'd)

```
PAD  LOC  OBJECT CODE   STMT   SOURCE STATEMENT

026  259  01001111      653    SSDIRCT   TCY    DIRECT
003  274  00111001      654              TBIT1  2
010  24F  10010000      655              BR     SSTEPR
034  259  01001110      656    SSTEPF    TCY    ACCLLFWD
020  275  00100011      657    SGO       TYA
01A  268  00001010      658              TDO
035  251  00001000      659    SSCOZ     TKA
029  265  01111110      660              ALEC   7
012  24A  10110100      661              BR     SSCOZ
024  252  00001000      662    SSCOZA    TKA
038  263  01111110      663              ALEC   7
011  247  10000100      664              BR     SSTEPDIR
022  24A  10100100      665              BR     SSCOZA
034  253  01001111      666    SSTEPDIR  TCY    DIRECT
009  264  00111001      667              TBIT1  2
013  24F  10010100      668              BR     SSTPOCR
016  25A  01001101      669              TCY    DCCELFWD
00C  273  00100011      670    SSTEPOUT  TYA
019  267  00100011      671              TYA
032  249  00100011      672              TYA
025  255  00100011      673              TYA
03A  268  00001010      674              TDO
015  257  00010101      675              BL     SS2
02A  26A  10110101      676
014  250  01001110      677    SSTPOCR   TCY    DCCELREV
028  262  10001100      678              BR     SSTEPOUT
010  240  01001101      679    SSTEPR    TCY    ACCELREV
020  242  10101101      680              BR     SGO
                        681              PAGE
000  283  00011111      682              BL     INIT
001  284  10000000      683
                        684    ******************************************************************
                        685    *                              NEWADDR                           *
                        686    *                                                                *
                        687    *                                                                *
                        688    *   THE DIRECTION TO BE MOVED IS DETERMINED. THE NEW ADDRESS IS  *
                        689    *    CALCULATED AND TESTED TO DETERMINE VALIDITY:                *
                        690    *                                                                *
                        691    *                  0 < VALID ADDRESS < MAXTRACK                  *
                        692    *                                                                *
                        693    *   IF THE NEW ADDRESS IS INVALID, THE OLD ADDRESS IS SAVED AND  *
                        694    *   THE PROGRAM RETURNS TO THE SCAN ROUTINE WITH THE SEEK ERROR  *
                        695    *   SIGNAL ACTIVE. IF THE NEW ADDRESS IS VALID, IT IS SAVED.     *
                        696    *   SEEK ERROR IS RESET AND THE PROGRAM EXECUTES THE MOVE ARM    *
                        697    *   ROUTINES.                                                    *
                        698    *                                                                *
                        699    ******************************************************************
003  29C  01001001      700    NEWADDR   TCY    9          ADD 14 TO ADDRESS.
007  29C  01101110      701              TCMIY  7
00F  28C  01100010      702              TCMIY  4
01F  28F  00011000      703              CALLL  ADD
03F  28F  11000011      704
03E  289  01001001      705              TCY    9          IS ADDRESS GREATER THAN MAX TRACK?
03D  286  01101110      706              TCMIY  7
03B  28F  01100100      707              TCMIY  2
037  291  00011100      708              CALLL  COMP
02F  290  11000011      709
01E  280  01001100      710              TCY    SEEKR
03C  281  01110000      711              ALEC   0
039  2A6  10011101      712              BR     TWHICHWY   NO, CALCULATE NEWTCKCNT
033  28F  00001101      713              SETR              YES, SET SEEKR AND WAIT FOR NEW ADDRESS.
027  290  00010001      714              BL     SCAN
00E  260  10001111      715
01D  287  00011101      716    TWHICHWY  BL     WHICHWY
03A  2A9  10000011      717
035  296  00001000      718    SS2       TKA
020  2A0  01111110      719              ALEC   7
016  298  10110101      720              BR     SS2
02C  282  00001000      721    SS3       TKA
018  2A0  01111110      722              ALEC   7
030  281  10000010      723              BR     SS4
021  285  10101100      724              BR     SS3
002  2A8  00011001      725    SS4       CALLL  DCRAD
005  294  11111101      726
00B  25C  00111010      727              TBIT1  1
017  24F  10101001      728              BR     SSDIRC
02F  29A  01000101      729              TCY    10
01E  280  01101111      730              TCMIY  15
038  2A1  00101000      731              IMAC
031  296  10100011      732              BR     SSETTRU
023  280  01000100      733    SSETTRU   TCY    TRULNUL
005  298  00100011      734              TYA
00D  284  00001010      735              TDO
018  25F  00011011      736              CALLL  SETTLE
036  299  11000011      737
02D  235  00111100      738              LDX    0
01A  248  00010111      739              BL     CONTROL
034  291  10000011      740
029  2A5  00011001      741    SSDIRC    BL     SSDIRCT
012  258  10000110      742
                        743              PAGE

******************************************************************
```

Table III

```
1085  **********************************************************************
1086  *                                                                    *
1087  *                          ERRASE                                    *
1088  *                                                                    *
1089  *    WHEN AN ERRASE COMMAND IS RECEIVED, THE ARM POSITION WILL       *
1090  *    BE OFFSET IN THE OPPOSITE DIRECTION FROM WHICH IT WAS LAST      *
1091  *    OFFSET. THE INPUTS ARE MONITORED FOR THE TERMINATION OF THE     *
1092  *    ERRASE COMMAND OR A LOSS OF THE SENSORNUL SIGNAL. WHEN          *
1093  *    TERMINATED NORMALLY THE OFFSET IS REMOVED AND THE PROGRAM       *
1094  *    RETURNS TO THE NORMAL SCAN ROUTINE. IF ANY OTHER INPUT GOES     *
1095  *    HIGH IT IS ASSUMED TO BE A LOSS OF SENSORNUL, COMPLETE IS       *
1096  *    SET LOW AND CONTROL IS TRANSFERED TO THE ERROR ROUTINE.         *
1097  *                                                                    *
1098  **********************************************************************
```

| | | | | | | | |
|---|---|---|---|---|---|---|---|
| 035 | 316 | 01000010 | 1100 | ERRASE | TCY | 4 | GET LEAN FLAG |
| 02B | 32D | 00111000 | 1101 | | TBIT1 | 0 | TEST LEAN FLAG |
| 016 | 318 | 10110110 | 1102 | | BR | SETLA | IF 1, LEANED B LAST TIME, LEAN A THIS TIME |
| 02C | 332 | 00110000 | 1103 | | SBIT | 0 | SET CLEAN FLAG |
| 018 | 320 | 01000101 | 1104 | | TCY | LEANB | LOAD LEAN B OUTPUT CODE |
| 030 | 301 | 00100011 | 1105 | OPERAS | TYA | | |
| 021 | 305 | 00001010 | 1106 | | TDO | | OUTPUT LEAN INSTRUCTION |
| 002 | 30B | 00001000 | 1107 | ERSTST | TKA | | INPUT K LINES |
| 005 | 314 | 01001101 | 1108 | | TCY | 11 | |
| 00B | 32C | 00000011 | 1109 | | TAM | | |
| 017 | 31F | 00111011 | 1110 | | TBIT1 | 3 | |
| 02E | 33A | 10110011 | 1111 | | BR | ERSERR | |
| 01C | 330 | 00111001 | 1112 | | TBIT1 | 2 | |
| 038 | 321 | 10000010 | 1113 | | BR | ERSTST | IF K LINE = 1, ERRASE HIGH |
| 031 | 306 | 10110100 | 1114 | | BR | CLRLN | |
| 023 | 30D | 01000000 | 1115 | ERSERR | TCY | CMPLT | MUST BE SNSRNL |
| 006 | 31B | 00001100 | 1116 | | RSTR | | RESET COMPLETE LINE |
| 00D | 334 | 00011010 | 1117 | | BL | ERROR | BRANCH TO ERROR ROUTINE |
| 01B | 32F | 10000011 | 1118 | | | | |
| 036 | 319 | 00110100 | 1119 | SETLA | RBIT | 0 | RESET LEAN FLAG |
| 02D | 335 | 01000110 | 1120 | | TCY | LEANA | LOAD LEANA OUTPUT CODE |
| 01A | 328 | 10110000 | 1121 | | BR | OPERAS | BRANCH TO OUTPUT INSTRUCTION |
| 034 | 311 | 01000100 | 1122 | CLRLN | TCY | TRUENUL | LOAD TRUENL OUTPUT CODE |
| 029 | 325 | 00100011 | 1123 | | TYA | | |
| 012 | 308 | 00001010 | 1124 | | TDO | | OUTPUT INSTRUCTION |
| 024 | 312 | 01001110 | 1125 | | TCY | 7 | |
| 003 | 323 | 01100000 | 1126 | | TCMIY | 0 | DELAY 3 MS. TO ALLOW THE POSITION SIGNAL, |
| 011 | 307 | 01100111 | 1127 | | TCMIY | 14 | TO DROP BELOW THE NARROW SNSRNL THRESHOLD. |
| 022 | 30A | 01001110 | 1128 | ERST | TCY | 7 | |
| 004 | 313 | 00100001 | 1129 | | TMA | | |
| 009 | 324 | 00101000 | 1130 | | IMAC | | |
| 013 | 30F | 10011001 | 1131 | | BR | ERST2 | |
| 026 | 31A | 00000011 | 1132 | | TAM | | |
| 00C | 333 | 10100010 | 1133 | | BR | ERST | |
| 019 | 327 | 00100000 | 1134 | ERST2 | TAMIY | | |
| 032 | 309 | 00100001 | 1135 | | TMA | | |
| 025 | 315 | 00101000 | 1136 | | IMAC | | |
| 00A | 32B | 10010100 | 1137 | | BR | ERST3 | |
| 015 | 317 | 00000011 | 1138 | | TAM | | |
| 02A | 32A | 10100010 | 1139 | | BR | ERST | |
| 014 | 310 | 00011000 | 1140 | ERST3 | BL | LOCKFIX | GO TO THE LOCKFIX ROUTINE ON ROM PAGE 1. |
| 028 | 322 | 10100100 | 1141 | | | | |

Table IV

| PAD | LOC | OBJECT CODE | STMT | SOURCE STATEMENT | | | |
|---|---|---|---|---|---|---|---|
| 000 | 143 | 00011111 | 519 | | BL | INIT | |
| 001 | 144 | 10000000 | 520 | | | | |

```
521  **********************************************************************
522  *                                                                    *
523  *                          ERROR                                     *
524  *                                                                    *
525  *    THE ERROR ROUTINE RETURNS THE ARM TO THE HOME POSITION AND      *
526  *    THEN TRANSFERS THE LAST ADRESS FROM MEMORY TO TKCNT AND MOVES   *
527  *    TO THAT POSITION. IF  THE LAST ADDRESS WAS 00 THE MOVE ROUTINE  *
528  *    WILL BRANCH BACK TO THE SCAN ROUTINE  ALLOWING THIS ROUTINE TO  *
529  *    BE USED TO INITIALIZE THE ARM POSITION.                         *
530  *                                                                    *
531  **********************************************************************
```

| | | | | | | | |
|---|---|---|---|---|---|---|---|
| 003 | 14C | 01000000 | 533 | ERROR | TCY | CMPLT | RESET COMPLETE SIGNAL |
| 007 | 15C | 00001100 | 534 | | RSTR | | |
| 00F | 17C | 00010111 | 535 | | BL | NEWERR | MOVE FORWARD M TRACKS |
| 01F | 17F | 10000011 | 536 | | | | |
| 03F | 17E | 11110010 | 537 | ERRORB | CALL | MUX3 | SET MUX FOR HOME |
| 03E | 179 | 00001000 | 538 | | TKA | | |
| 03D | 176 | 01001101 | 539 | | TCY | 11 | |
| 03B | 16E | 00000011 | 540 | | TAM | | |
| 037 | 15E | 00111010 | 541 | | TBIT1 | 1 | |
| 02F | 17D | 10111100 | 542 | | BR | EB | |
| 01E | 178 | 10001001 | 543 | | BR | EA | IF NOT HOME MOVE 1 TRACK REV |
| 03C | 171 | 01001111 | 544 | EB | TCY | FLAGS | SET FLAGS TO RETURN TO ERROR ROUTINE |
| 039 | 166 | 01100100 | 545 | | TCMIY | 2 | |
| 033 | 14E | 01001110 | 546 | | TCY | 7 | |

Table IV (cont'd)

```
PAD  LOC  OBJECT CODE   STMT   SOURCE STATEMENT

027  15D  01101000      547               TCMIY 1
00E  17B  10100010      548               BR    MOVERR    MOVE 1 TRACK  FORWARD
01D  177  11110010      549    ERRORC     CALL  MUX3      SET MUX FOR HOME
03A  169  00001000      550               TKA
035  156  01001101      551               TCY   11
02B  16D  00000011      552               TAM
016  158  00111010      553               TBIT1 1
02C  172  10110000      554               BR    EC
018  160  10001001      555               BR    EA        IF NOT HOME MOVE 1 TRACK REVERSE
030  141  01001111      556    EC         TCY   FLAGS     SET FLAGS TO RETURN TO ERROR TOUTINE
021  145  01101010      557               TCMIY 5
002  14B  01001110      558               TCY   7
005  154  01101000      559               TCMIY NL
00B  16C  01101100      560               TCMIY NM
017  15F  10100010      561               BR    MOVERR    MOVE  N TRACKS REVERSE
02E  17A  11110010      562    ERRORD     CALL  MUX3      SET MUX FOR HOME
01C  170  00001000      563               TKA
038  161  01001101      564               TCY   11
031  146  00000011      565               TAM
023  14D  00111010      566               TBIT1 1
006  15B  10011011      567               BR    ED
00D  174  10001001      568               BR    EA        IF NOT HOME MOVE 1 TRACK REVERSE
01B  16F  01000000      571    ED         TCY   0         IF HOME, HOME. NOW GO TO LAST TRACK ADDRESS
036  159  00100001      572               TMA
03D  175  01001110      573               TCY   7
01A  168  00000011      574               TAM
034  151  01001000      575               TCY   1
029  165  00100001      576               TMA
012  148  01000001      577               TCY   8
024  152  00000011      578               TAM
008  163  01001111      579               TCY   FLAGS     SET FLAGS FOR NORMAL FORWARD MOVE
011  147  01100000      580               TCMIY 0         MOVE TO LAST TRACK ADDRESS
022  14A  00010110      581    MOVERR     BL    STEP
004  153  10000011      582
009  164  01001111      583    EA         TCY   FLAGS     SET FLAGS TO RETURN TO ERROR ROUTINE
013  14F  01101110      584               TCMIY 7
026  15A  01001110      585               TCY   7
00C  173  01101000      586               TCMIY 1
019  167  10100010      587               BR    MOVERR    MOVE 1 TRACK REVERSE
032  149  01000100      588    MUX3       TCY   TRUENUL   LOAD OPLA WITH WORD FOR TRUENULL AND PROPER
025  155  00100011      589               TYA             MUX FOR INPUTING HOME SIGNALS
00A  16B  00001010      590               TDO
015  157  00001111      591               RETN
                        592               PAGE
****************************************************************************

PAGE NUMBER  5 CONTAINS 59 ROM INSTRUCTIONS.
```

Table V

```
000  003  00011111       80               BL    INIT
001  004  10000000       81
                         82    *******************************************************************
                         83    *                                                                 *
                         84    *                             CLEAN                               *
                         85    *                                                                 *
                         86    *  THE CLEAN ROUTINE TURNS ON THE DISC MOTOR AND WAITS FOR IT TO  *
                         87    *  COME UP TO SPEED. THE FRONT PANEL LITE IS TURNED ON UNTIL THE  *
                         88    *  ROUTINE IS COMPLETE OR THE CARTRIDGE REMOVED. ONCE THE DISC    *
                         89    *  MOTOR IS UP TO SPEED THE HEAD IS MOVED FROM HOME TO TRACK 79   *
                         90    *  USING THE ERROR ROUTINE. THIS IS DONE 14 TIMES. THE HEAD IS THEN *
                         91    *  MOVED HOME AND LEFT THERE. THE FRONT PANEL LITE IS TURNED OFF  *
                         92    *  SIGNALING COMPLETION OF THE ROUTINE.                           *
                         93    *                                                                 *
                         94    *******************************************************************

003  00C  01000000       96    CLEAN      TCY   CMPLT     TURN ON LITE.
007  01C  00001100       97               RSTR
00F  03C  01000011       98               TCY   LOCKFLG   TEST TO SEE IF DISC MOTOR IS LOCKED
01F  03F  00111010       99               TBIT1 1
03F  03E  10111011      100               BR    TCLN      MOTOR LOCKED, GO AHEAD WITH CLEAN ROUTINE
03E  039  00010001      101               BL    SCAN      MOTOR NOT LOCKED, GO BACK TO SCAN ROUTINE
03D  036  10001111      102
03B  02E  01001010      103    TCLN       TCY   5         GET COUNTER
037  01E  00100001      104               TMA
02F  03D  01111011      105               ALEC  13        IS COUNTER < 14 ?
01E  038  10100011      106               BR    GOCLN     YES, GO MOVE HEAD.
03C  031  01110111      107               ALEC  14        IS COUNTER = 15 ?
039  026  10000101      108               BR    GOHM      NO, MOVE HEAD HOME.
033  00E  01000000      109               TCY   CMPLT     YES,END OF CLEAN CYCLE,
027  01D  00001101      110               SETR            TURN OFF LITE.
00E  03B  01001100      111               TCY   TRUE2     SET MUX INPUT FOR CLEAN SIGNAL
01D  037  00100011      112               TYA
03A  029  00001010      113               TDO
035  016  01001101      114               TCY   11
```

Table V (cont'd)

```
02B  020  00011111  115  TSTCLN  LDP    15       LOOP UNTIL CLEANING CARTRIDGE IS REMOVED
016  018  00001000  116          TKA
02C  032  00000011  117          TAM
018  020  00111000  118          TBIT1  0        IS CLEAN HIGH ?
030  001  10000000  119          BR     INIT     YES, CLEANING CARTRIDGE OUT, REINITIALIZE.
021  005  00010000  120          BL     TSTCLN   NO, WAIT FOR CLEAN TO GO HIGH.
002  00B  10101011  121
005  014  00001110  122  GOHM    IA              INCREMENT COUNTER.
00B  02C  00000011  123          TAM
017  01F  01000000  124          TCY    0        LOAD ADDRESS EQUAL TO ZERO.
02E  03A  01100000  125          TCMIY  0
01C  030  01100000  126          TCMIY  0
038  021  00011010  127  CLNERR  BL     ERROR    MOVE HEAD HOME.
031  006  10000011  128
023  00D  00001110  129  GOCLN   IA              INCREMENT COUNTER.
006  01B  00000011  130          TAM
00D  034  01000000  131          TCY    0        SET ADDRESS FOR TRACK 79.
01B  02F  01100111  132          TCMIY  14
036  019  01101010  133          TCMIY  5        MOVE HEAD HOME THEN TO TRACK 79.
020  035  10111000  134          BR     CLNERR
```

What is claimed is:

1. A cartridge comprising:
   (a) a sheet of flexible information storage media having first and second opposite major surfaces, at least one of said major surfaces for storing information thereon; and
   (b) a cartridge housing in the form of a rigid envelope having an internal chamber with first and second surfaces oppositely positioned, at least portions of said first and second surfaces being relatively flat, said media being retained within said chamber, said cartridge housing having:
      (i) a first opening extending through a central region of one of said first and second surfaces for providing access to said media to impart rotational motion thereto;
      (ii) a second opening extending through said first surface for receiving a magnetic head transducer for respectively reading and/or writing information on said media; and
      (iii) said first surface including a raised portion having a curved surface in facing relationship with said media for causing said media to conform to the curvature of said curved surface as it passes over said raised portion, said second opening being substantially contained within said raised portion.

2. A cartridge according to claim 1 wherein said second opening is a rectangular opening with a major axis extending at least partially between one side of said first surface and said first opening.

3. The cartridge according to claim 2 wherein said raised portion has a major axis extending parallel to said major axis of said second opening, said first opening and at least a portion of said second opening extending through said raised portion of said first surface.

4. The cartridge according to claim 3 wherein said cartridge is substantially rectangular in shape and said raised portion is also rectangular, said raised portion having a major axis extending at least partially across said first surface and perpendicular to opposite sides thereof.

5. The cartridge according to claim 1 wherein said raised portion has a radius of curvature of essentially six inches.

6. The cartridge according to claim 1 wherein said information storage media is a circular magnetic recording disc having a magnetic flux-responsive coating positioned thereon.

7. In an information storage system having a magnetic head transducer for reading and/or writing information on a sheet of flexible information storage media, a cartridge comprising:
   (a) a sheet of flexible information storage media having first and second opposite major surfaces, at least one of said major surfaces for storing information thereon; and
   (b) a cartridge housing in the form of a rigid envelope having an internal chamber with first and second surfaces oppositely positioned, at least portions of said first and second surfaces being relatively flat, said media being retained within said chamber, said cartridge housing having;
      (i) a first opening extending through a central region of one of said first and second surfaces for providing access to said media to impart rotational motion thereto;
      (ii) a second opening extending through said first surface for receiving said magnetic head transducer; and
      (iii) said first surface including a raised portion having a curved surface in facing relationship with said media for causing said media to conform to the curvature of said curved surface as it passes over said raised portion, said second opening being substantially contained within said raised portion.

8. The system according to claim 7 wherein said information storage media is a circular magnetic recording disc.

9. The system according to claim 7 wherein said raised portion has a radius of curvature of essentially six inches.

10. The cartridge according to claim 7 wherein said second opening is a rectangular opening with a major axis extending at least partially between one side of said first surface and said first opening.

11. The system according to claim 10 wherein said first surface functions as a smoothing plane for said media, the rotational motion of said media creating an air cushion between said smoothing plane surface and said media, thereby causing said media to rise above said smoothing plane surface while said media is in rotation.

12. The system according to claim 10 wherein said raised portion has a major axis extending parallel to said major axis of said second opening, said first opening and at least a portion of said second opening extending through said raised portion of said first surface.

13. The system according to claim 12 wherein said cartridge and said first surface are substantially rectangular and said raised portion is essentially rectangular, the major axis of said raised portion extending at least partially across said first surface and perpendicular to opposite sides thereof.

* * * * *